April 6, 1954 J. L. BOGERT ET AL 2,674,512

BROADCAST AUDIENCE MEASUREMENT

Filed Aug. 24, 1951

8 Sheets-Sheet 1

INVENTORS:
JOHN LYMAN BOGERT,
CONKLING CHEDISTER

BY Morgan, Finnegan and Durham
ATTORNEYS.

INVENTORS
JOHN LYMAN BOGERT
CONKLING CHEDISTER
BY
Morgan, Finnegan & Durham
ATTORNEYS.

INVENTORS:
JOHN LYMAN BOGERT,
CONKLING CHEDISTER
BY Morgan, Finnegan and Durham
ATTORNEYS.

April 6, 1954

J. L. BOGERT ET AL

BROADCAST AUDIENCE MEASUREMENT 2,674,512

Filed Aug. 24, 1951

8 Sheets-Sheet 4

INVENTORS:
JOHN LYMAN BOGERT
CONKLING CHEDISTER
BY Morgan, Finnegan & Durham
ATTORNEYS April 6, 1954

J. L. BOGERT ET AL 2,674,512

BROADCAST AUDIENCE MEASUREMENT

Filed Aug. 24, 1951

8 Sheets-Sheet 5

INVENTORS
JOHN LYMAN BOGERT
CONKLING CHEDISTER

BY Morgan, Finnegan & Durham
ATTORNEYS.

INVENTORS
JOHN LYMAN BOGERT
BY CONKLING CHEDISTER
Morgan, Finnegan & Durham
ATTORNEYS.

April 6, 1954 J. L. BOGERT ET AL 2,674,512

BROADCAST AUDIENCE MEASUREMENT

Filed Aug. 24, 1951

8 Sheets-Sheet 7

INVENTORS
JOHN LYMAN BOGERT
CONKLING CHEDISTER
BY
Morgan, Finnegan & Durham
ATTORNEYS.

INVENTORS
JOHN LYMAN BOGERT
CONKLING CHEDISTER
BY Morgan, Finnegan & Durham
ATTORNEYS.

Patented Apr. 6, 1954

2,674,512

UNITED STATES PATENT OFFICE 2,674,512

BROADCAST AUDIENCE MEASUREMENT

John Lyman Bogert, New York, N. Y., and Conkling Chedister, Livingston, N. J., assignors to C. E. Hooper, Inc., New York, N. Y., a corporation of New York Application August 24, 1951, Serial No. 243,490

13 Claims. (Cl. 346—37)

The invention relates to apparatus and methods for broadcast audience measurement and recording.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate embodiments of the invention, and together with the description, serve to explain the principles of the invention.

The present application is a continuation-in-part of our copending application Serial No. 149,994, filed March 16, 1950.

Figure 5:
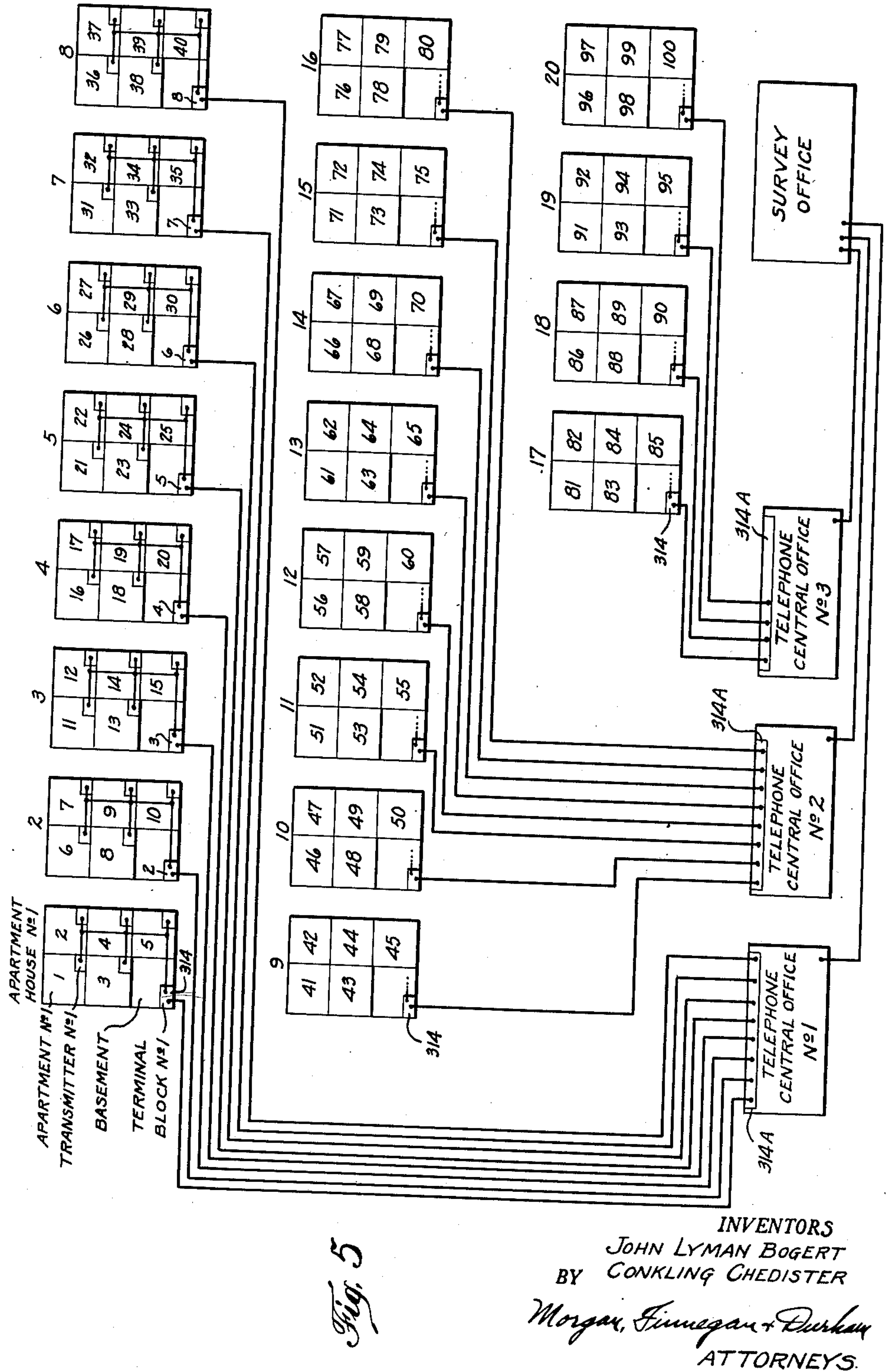
Fig. 5 is a diagrammatic layout of apparatus and system in a modified embodiment of the invention showing a plurality of apartment houses, telephone central offices, and the survey headquarters office.
Figure 6:
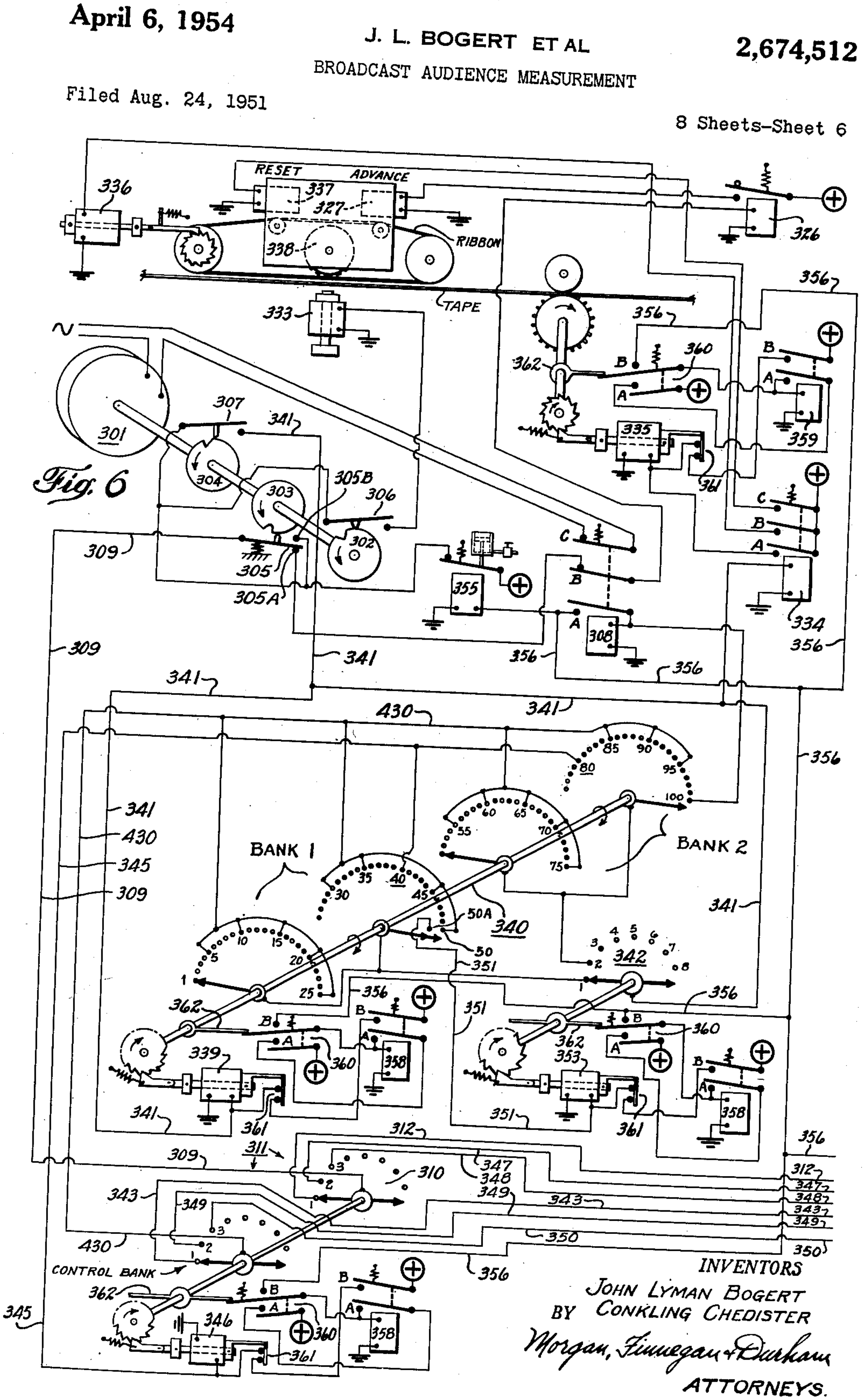
Fig. 6 is a diagrammatic showing of the master mechanism and recorder at the survey office of the embodiment of the invention shown in Fig. 5.
Figure 9:
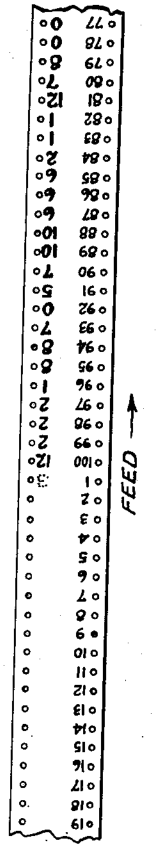
Figure 7:
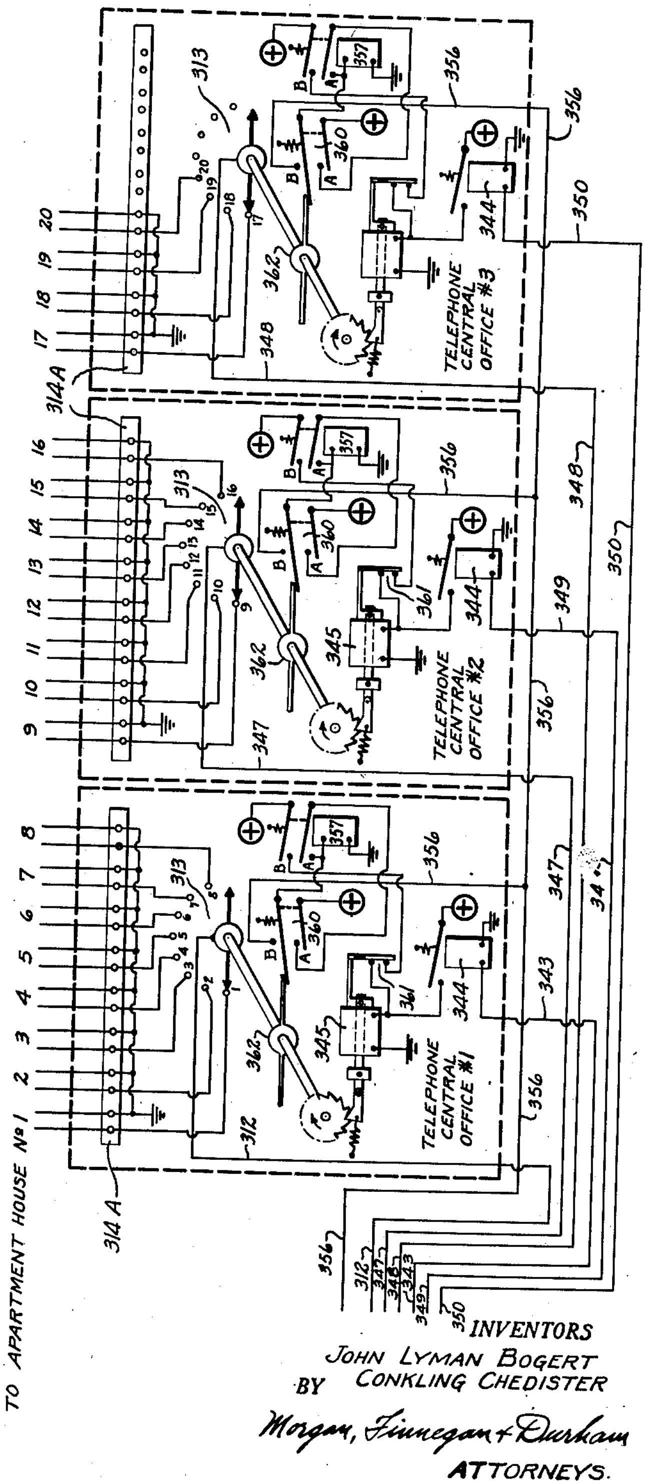
Fig. 7 is a diagrammatic showing of the mechanism for the several telephone central offices shown in Fig. 5.
Figure 8:
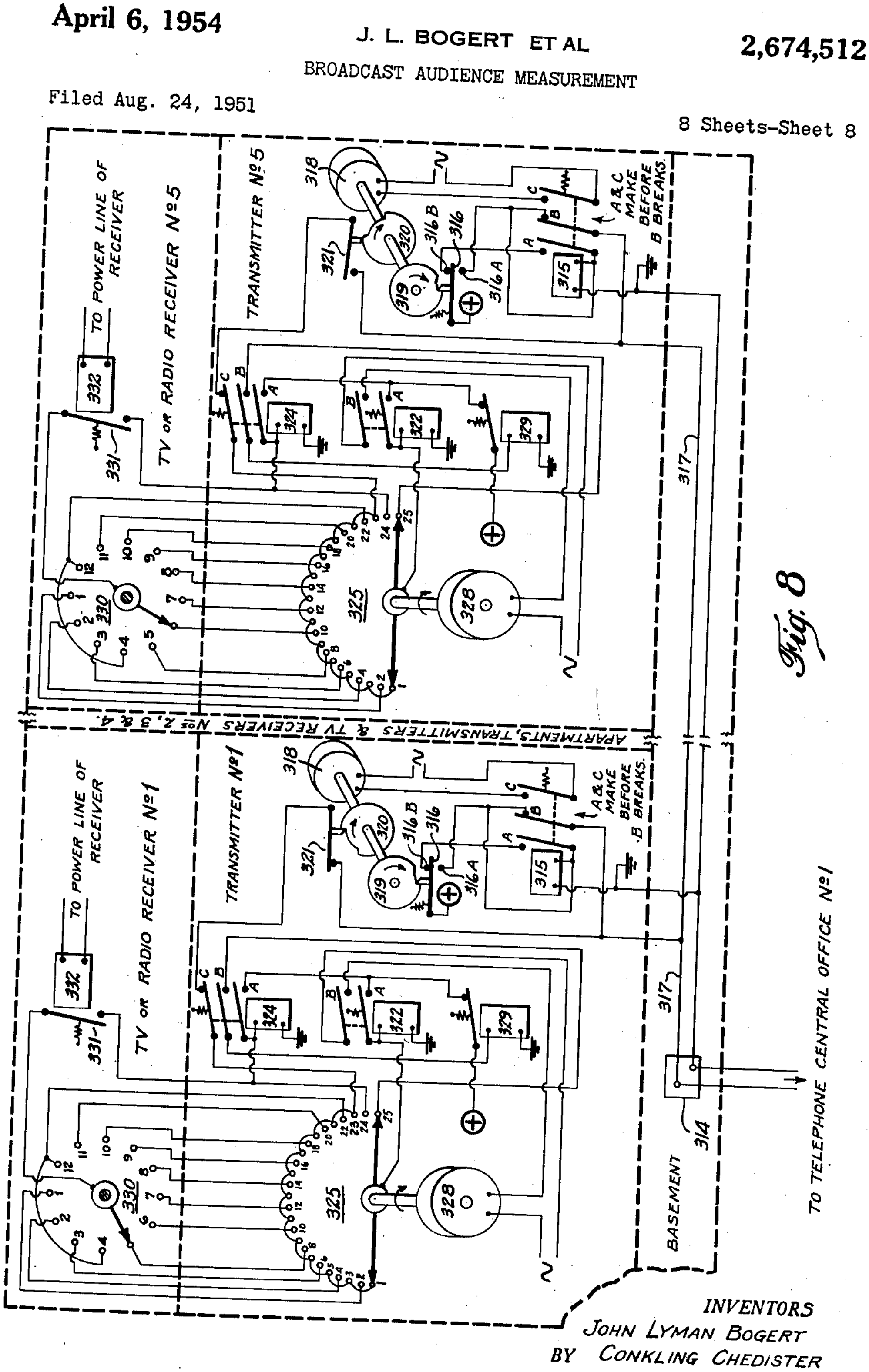

Fig. 8 is a diagrammatic showing of the scanning and transmitting equipment at the sets to be surveyed and at the apartment house, using apartment house No. 1 and apartments 1 and 5 therein as shown in Fig. 5, as illustrative of applicants' equipment and system; and Fig. 9 is a fragmentary showing of the strip record made at the survey office by the mechanism and system illustrated in Figs. 5 to 8 inclusive.

The primary object of the invention is to ascertain and record data relating to the operation of a plurality of broadcast receivers, so as to provide a basis for measuring the listening and viewing habits of broadcast audiences. The term "broadcast receivers" is here intended to signify receiving sets for television or AM or FM radio. While various systems for sampling the listening habits of radio audiences are known, some of which are based upon telephonic or written polls and others upon records made at selected receiving sets, such known systems have many undesirable features. Systems which depend upon local recording apparatus are inaccurate, difficult and expensive to install, operate and maintain, and are not capable of giving many of the data necessary to the preparation of comprehensive surveys. Telephonic poll systems, while more accurate and comprehensive, are very costly to operate and depend much upon the human factors involved, such as the intelligence and cooperation of the persons answering the telephone.

Another object is to provide a system for obtaining and recording data at a survey office from selected receivers in homes without contact with the homes or set owners once the system is installed, the desired information being automatically transmitted by permanent connection from sets to the main survey office.

Still another object is the swift, accurate, automatic and continuous transmission of the desired data from receiving sets in the home to the central survey and recording office.

The present invention in one of its embodiments provides a system for obtaining and recording data with respect to the locations of receiving sets, the types of receivers (television or AM or FM radio), the time of the report, whether or not a set is in operating condition or defective, whether it is on or off, and, if on, the channel or station to which it is tuned. Such data may be obtained from any selected number of receiving sets and locations and are all recorded chronologically in legible printed form on a record sheet. By virtue of the invention such data are obtained and recorded without the need of any special equipment for synchronizing or sorting out the signals transmitted from the various receiving sets or locations. The control and operation of the system primarily depends upon simple, direct current pulses and no special tuning, production or reception of radio frequency signals or other complicated and delicate electrical characteristics are involved.

Still another important object of the invention is to effect the selection, initiation and control of data-transmitting devices from a central recording station by means of direct current impulses in a given direction and polarity over a leased telephone line or lines and to effect the transmission of signals carrying the data from the receiving sets to the survey recording station by similar pulses in the opposite direction or polarity over the same line or lines. In accordance with the invention the order of transmission of data from the receiving sets to the survey station is selectively controlled from that station, as well as the times of transmission and the initiation thereof.

By virtue of the features mentioned above, the invention provides an exceedingly simple, foolproof and rugged system of data transmission and recording which can operate wholly automatically, without attention or interference on the part of the receiving-set owners and without any electrical or mechanical interference with the operations of such sets.

It will be understood that the foregoing general description and the following detailed description as well are exemplary and explanatory but are not restrictive of the invention.

Figure 1:
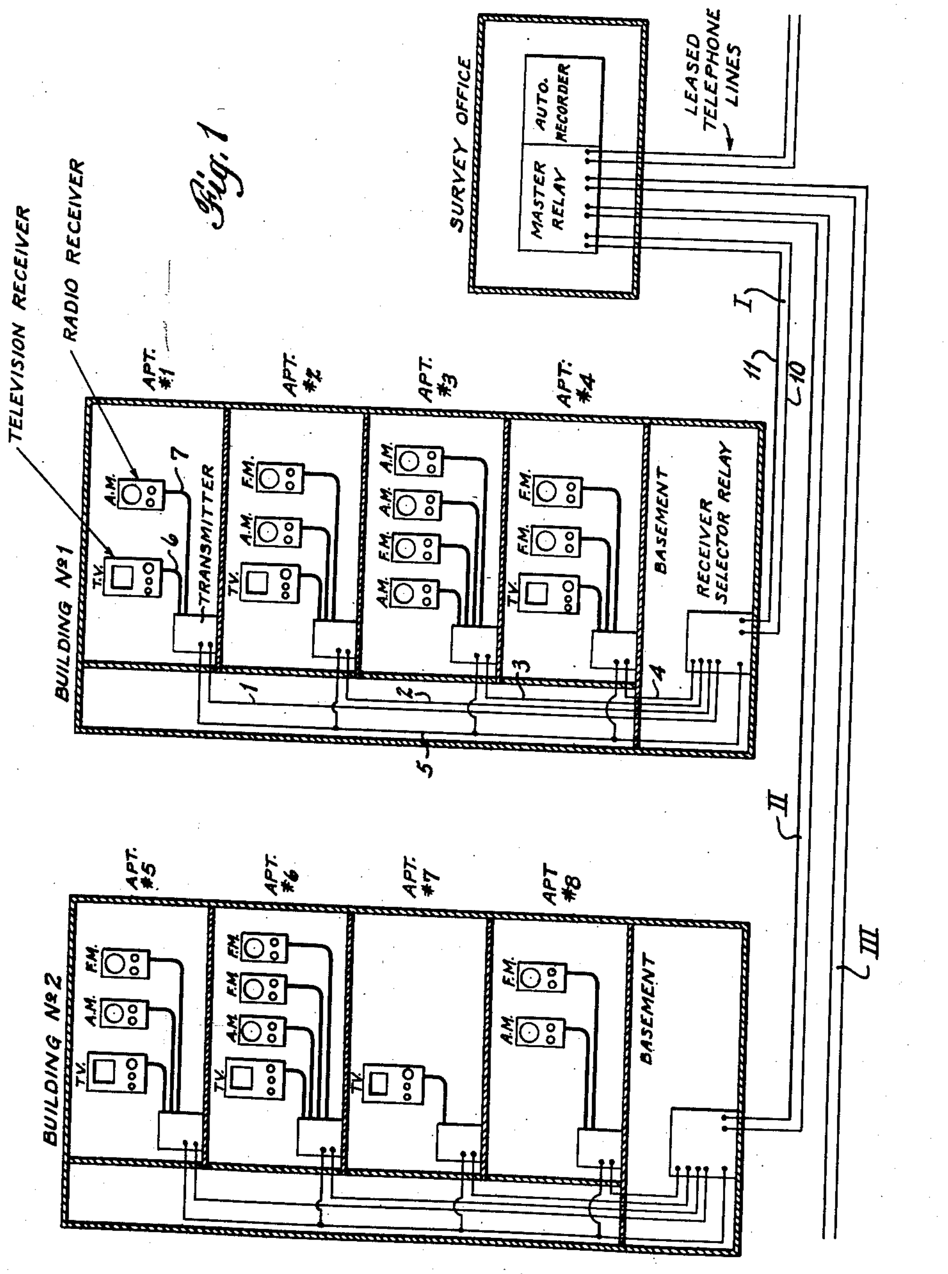
Fig. 1 is a diagrammatic layout of apparatus of one embodiment of the invention as applied to a plurality of broadcast receivers in a plurality of homes located in a plurality of buildings.

Referring now in detail to the embodiments of the invention illustrated by way of example in the accompanying drawings, and referring first to the embodiment of the invention shown in Figs. 1 to 4 inclusive, Fig. 1 shows a diagrammatic layout of a system embodying certain of the features of the invention. The major units of such system comprise the main survey office which contains an Automatic Recorder and also a Master Relay for sequentially connecting and controlling the various circuits to the receiver transmitters. The other major unit of the system may be considered as a building containing a plurality of homes or apartments, the connection between the building and the survey office being a single two-wire telephone line. Two such buildings are shown in Fig. 1, each building containing four apartments or homes. Referring to building No. 1, such unit contains two principal sub-units, one being the Receiver Selector relay which is conveniently located in the basement or other central location and into which the leased telephone line from the Master Relay is connected. The Receiver Selector relay in turn is connected with the other sub-units, that is the transmitter in each of the several apartments in the building. Such connections are by means of individual telephone lines 1, 2, 3 and 4 leading to the respective apartments #1, #2, #3, and #4, and a common or return wire 5 which has branch returns to each apartment. Each of these pairs of wires is connected to a Transmitter in the respective apartments, and the Transmitters in turn are connected by suitable leads, hereinafter described in detail, to individual television and radio receivers in such apartments. For example, in building No. 1, the Transmitter of apartment #1 is connected by cable 6 to a television receiver and by cable 7 to an AM radio receiver; while in the other apartments the corresponding Transmitters are connected to the various television and radio sets therein by appropriate numbers of cables.

Figure 3:
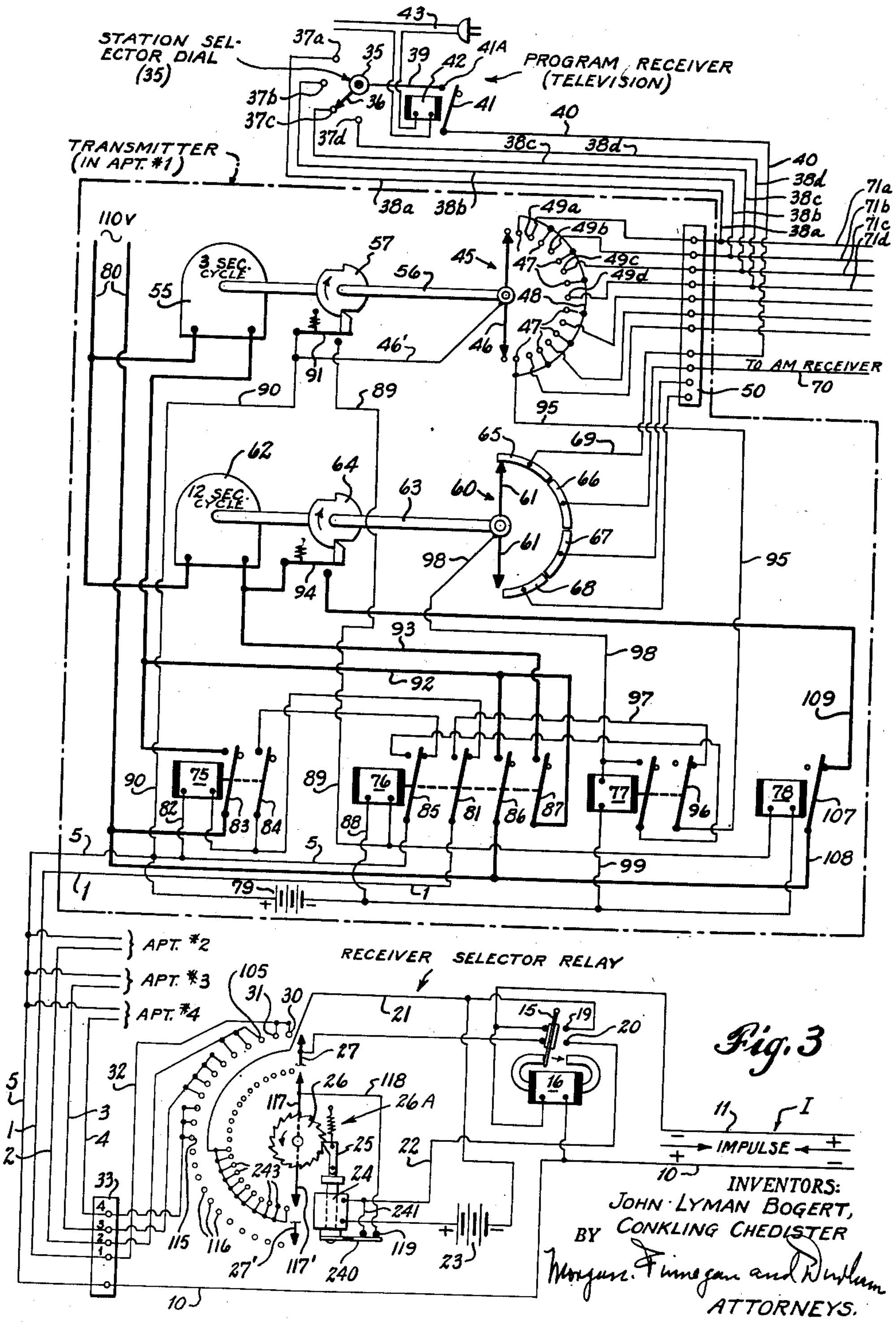
Fig. 3 is a diagrammatic view of the scanning and transmitting equipment for one home and the selective relay for one apartment building.

Details of the Receiver Selector relay in the basement of building No. 1, and of the Transmitter in apartment #1, are shown in Fig. 3. The Receiver Selector relay is directly connected to the main telephone line I, comprising the wires 10 and 11 (Figs. 1 and 3). A polarized relay is connected to close one of two different circuits, depending upon the polarity or direction of the pulse sent over the telephone line I into relay winding 16. Said relay comprises movable blade 15, the position of which is controlled by the polarity of energization of winding 16. If the sense or polarity of the pulse is positive, as indicated by the arrow pointing to the left in Fig. 3, the contact blade 15 is moved in the opposite direction to close the circuit across the two contacts 19 and 20, to the right in Fig. 3. When so moved, the blade 15 closes a circuit from battery 23, through the leads 21 and 22 to energize and operate solenoid 24, moving a reciprocating pawl 25 downwardly and advancing the ratchet wheel 26 one step upon deenergization of 24.

The pawl and ratchet mechanism described above are part of a rotary stepping switch 26A having the contact arm 27 provided for sweeping a series of contacts arranged arcuately in its path. Said contacts are arranged in order and number corresponding to the receiver sets in the various apartments of building No. 1. Thus contact 30 corresponds to the television receiver in apartment #1 and contact 31 to the AM radio receiver in the same apartment. Both these contacts are connected to lead wire 32 which, through panel 33, connects with wire 1 for the transmitter in apartment #1. Thus it will be evident that after a positive pulse is sent over the line I (wires 10 and 11), as indicated by the arrow pointing to the left, the ratchet wheel 26 will be rotated one notch to position the switch arm 27 on the next succeeding contact point of the rotary stepping switch 26A. Accordingly the cessation of the first such positive impulse will cause the rotary switch arm 27 to step to contact 30 and connect wiper 27 to the transmitter for apartment #1 through line 1.

The device shown within the dot-and-dash lines in Fig. 3 comprise construction and wiring of the "transmitter" for apartment #1. It will be understood that the construction and wiring of the transmitter provided for each apartment or home will be essentially the same.

In Fig. 3, above the dot-and-dash line, is shown the construction and wiring provided at the television receiver set in apartment #1. A similar construction is provided at each receiver, whether television or radio. Said construction comprises a selector switch 35 having a rotatable arm 36 mechanically coupled to turn with the selector knob or dial 35' or other tuning device of the receiver. Arm 36 cooperates with a series of contact points, said points corresponding to the various channels or stations to which the TV or other set may be tuned. Thus in the example shown, there are four such contact points 37*a*, 37*b*, 37*c* and 37*d*, each of which is provided with a conductor wire indicated as 38*a*, 38*b*, 38*c* and 38*d*, respectively. The contact arm 36 is connected by conductor 39 to off-normal contact 41A cooperating with movable relay contact 41 which is connected to lead 40. This movable contact 41 of relay 42 is operated by energization of the winding of relay 42, which winding is in series with the energizing power circuit 43 of the television receiver. Thus when the receiver is turned on, said relay contacts will be closed and the contact arm 36 is effective in a circuit.

The transmitter for apartment #1 is adapted to scan successively the tuned-in settings of the receivers in the apartment and transmit signals in accordance with such settings. For this purpose, the transmitter comprises a rotary stepping switch generally indicated at 45, having rotatable twin contact arms 46, designed for a 180° sweep. A group of pulse transmitting contacts 47, shown as eight in number, are mounted in the path of travel of the arm 46 and are all interconnected by a jumper 48. A group of other contacts 49 are also in the path of travel of arm 46. The contacts making up one group alternate with the contacts making up the other group. It will be noted that in group 49, contact 49*a* is connected to tuner contact 37*a* through panel 50; while contact 49*b* is connected to 38*b*; 49*c* to 38*c*; and 49*d* to 38*d*. Additional contacts are shown for possible connection to a greater number of station tuning contacts than the four shown. For the purpose of rotating contact arm 46, a synchronous A. C. motor 55 is operatively connected to the switch arm by shaft 56 and a switch operating control cam 57 is mounted on said shaft. As indicated, the motor 55 is geared to effect 180° rotation of the switch arm 46 in 3 seconds, this constituting a cycle for motor 55.

A second motor-driven rotary switch 60, having 180° twin contact arms 61, is also provided in the transmitter, said arm being driven from motor 62 by shaft 63 which carries a switch control cam 64. As indicated, the motor 62 has a 12 second cycle for 180° rotation of the switch arm 61 and a shorter 3 second cycle for changing segments every 45°.

As shown, each switch arm 61 adapted to sweep a series of four contact segments 65 to 68 inclusive in its 180° arc. The sweep time for each of said segments corresponds to the time to make one 180° sweep of one of the two switch arms 46. Conductor 40 of the television receiver unit makes contact with segment 65 through panel 50 and conductor 69. Thus when relay contacts 41A and 41 are closed, segment 65 is swept by contact arm 61 throughout almost one-quarter of arm travel (almost 45°), and that during the same three second cycle, contact arm 46 is sweeping all its contacts and thereby scanning the tuner position of the television receiver. Thus since shaft 56 rotates four times as fast as shaft 63, one wiper arm 46 will sweep by an entire bank of contacts while one wiper arm 61 is in contact with one contact segment of its own bank. The two shafts are initially positioned as shown, and are always simultaneously turned by their respective motors.

The dead space between adjacent segments in stepping switch 60 correspond to the dead position of wiper 46. Thus both stepping switches are simultaneously effective.

A common conductor 70, corresponding to conductor 40, leads from the AM receiver in apartment #1, and, as shown, taps into the second segment 66 of switch 60. In like manner the conductors 49*a*–49*d* of switch 45 are connected through panel 50 to the corresponding plurality of conductors 71*a*–71*d* which lead to station contacts at the tuner of the AM radio receiver. It is understood that each such AM receiver has a station selector arrangement resembling the one described for the TV receiver. Thus as the tuner of the AM receiver is operated to select an AM station, the corresponding switch arm is moved to a contact for that station. Thus when switch arm 61 is sweeping segment 66, the arm of switch 45 is adapted to scan the tuner setting of said AM receiver. Similarly segments 67 and 68 of switch 60 are designed, in cooperation with switch 45, to scan the tuning positions of other receivers in apartment #1 if they were added, such as in apartment #3, for example. There being only two receivers in apartment #1, no contacts are shown for connecting up segments 67 and 68.

The invention provides a plurality of relays for initiating and holding the necessary circuits for the operation of the switches 45 and 60 throughout the various cycles of scanning and signalling involved in the hook-up for apartment #1. Said relays comprise a starting relay 75, a holding relay 76, a circuit-breaking relay 77 and a time delay relay 78. All said relays are adapted to operate on low voltage direct current and a battery 79 is provided for supplying such power for the operation of certain of said relays and circuits. In addition a 110 volt A. C. line 80 is provided for operating the motors 55 and 62, previously described.

The initiation of a scanning cycle for the transmitter of apartment #1 is effected by a negative pulse over the main telephone line I from the central station. Previously thereto, a positive pulse will have been sent out and caused wiper 27 to step from the position shown to a position on contact 30. The first effect of said pulse is to set blade 15 firmly in the position shown in Fig. 3, which closes a telephone line circuit through switch arm 27 and contact 30, line 32 and line 1, into the transmitter described below. The reason said pulse is negative, that is, of a polarity opposite to that of which closes switch 19—20 to advance switch arm 27, is so that said switch arm will not be moved until a scanning cycle has been completed. For the same reason, all subsequent pulses during the scanning cycle will be of negative polarity.

Line 1 is in series with the coil of starting relay 75 through normally closed contact arm 81 or relay 76. Relay 75 has its winding connected to the line 5 of the telephone line by conductor 82. Relay 75 has two movable contacts indicated by their respective blades 83 and 84, said contacts being normally open. Contact 83 closes a branch of the 110 volt circuit to energize three-second motor 55 and thereby initiate its cycle of rotation.

Inasmuch as relay 75 is energized only by the momentary pulse from the telephone line, it is necessary to provide other means for holding the motor circuit closed. This means comprises holding relay 76 which serves to operate a gang of contacts comprising 85, 81, 86 and 87. The energization of holding relay 76 is effected by a circuit through battery 79 comprising leads 88, 89 and 90, said circuit being closed by switch 91, which is actuated by cam 57 immediately upon initiation of rotation of shaft 56. It is preferred to have relay 75 slow to release so that switch 91 will have time to close after initiation of rotation of motor 55. It will be clear from the shape of cam 57 that this circuit will remain closed throughout substantially one 180° rotation of cam 57 and switch arm 46. The simultaneous closing of switch 86 sets up a holding circuit through lead 92 for motor 55, while at the same time the closing of switch 87 energizes motor 62 through 110 volt lead 93. Thus with the energizing of the holding relay 76, which follows instantly upon the pulse that energizes relay 75, both switches 45 and 60 start their sweeps.

The signalling effect of the rotation of switch 45 will now be described. Contact arm 46 is connected to the positive pole of a battery 180 in the survey station (Fig. 2) by lines 46', 90, 5 and 10. As the contact arm 46 engages each contact 47, a pulse is sent through conductor 48 and via conductor 95 through closed relay contacts 96, over conductor 97 and through switch 81 into telephone line 1, thence through conductor 32, contact 30, switch arm 27, blade 15, and over telephone line 11 to the negative pole of battery 180 by a circuit to be described later. These pulses, which are negative in sense, are thus transmitted over the telephone line I to the survey station. Such pulses will be transmitted as the contact 46 engages each successive contact 47 until said moving contact encounters a circuit which is closed through the station selector dial switch 35, which, in the illustrative case shown in the drawings, will be contact 49c through station contact 37c. When this contact is made, current then flows through conductor 38c, through switch 35, and over conductor 40, through conductor 69, segment 65, switch arm 61 and then via conductor 98 to energize relay 77 which is connected to the battery 79 through conductor 99. The energization of said relay 77 moves relay contact 96 to break the circuit therethrough and thereby prevents the transmission of any more pulses from switch 45, although switch arm 46 continues its sweep to the end of its 180° motion. Accordingly, the number of pulses which will have been sent over telephone line I will be three, corresponding to the number and position of contact 37c. Hence a signal consisting of said three pulses will be transmitted to the main survey station, indicating that the position of the station selector dial of the TV receiver in apartment #1 is such as to be tuned to the corresponding channel.

When the receiver set is turned off, relay 42 will not be energized, so relay contact 41 will remain open. In that event all the contacts 47 will cause pulses to be sent over line 95 until the switch arm 46 has completed its 180° sweep. Consequently, such a complete series of pulses will serve as a signal that the receiver in question is turned off.

As will be clear from the drawings, the completion of one three-second cycle on the motor 55 will have moved cam 57 to the point where it opens switch 91. This de-energizes the holding relay 76, breaking all previously established contacts and stopping both motors 55 and 62. Rotating switch arm 46 will then be in the vertical position shown in Fig. 3 while rotating switch arm 60 will have just completed traverse of its first segment 65.

At this point a second positive pulse is sent out from the survey station to move switch arm 27 of the Receiver Selector relay to the second contact 31 and re-energize relay 75. This second pulse thereby initiates a second cycle of tuner scanning operation. However, during said second cycle the contact arm 61 will be in contact with segment 66 which, through lead 70, communicates with the AM radio receiver in apartment #1. Consequently, during this cycle the pulses generated by switch arm 46 will correspond to the condition and tuning-dial setting of that AM receiver. When the second cycle is completed switch 91 is again opened and the relays de-energized a second time.

Inasmuch as there are only two receivers in apartment #1 and only two contacts 30 and 31 leading to the transmitter for that apartment, the next positive pulse from the central station will bring contact arm 27 to engage contact 105 which is connected to the transmitter of apartment #2 through line 2. Accordingly no more pulses will be sent into the transmitter for apartment #1 and at the point described switch arm 61 will have stopped at the end of segment 66. Means are provided for automatically completing the 180° rotation of said arm 61 in such case. Such means comprise a relay 78 which is energized at the same time as holding relay 76. Relay 78, when energized, is designed to hold open switch 107 across the power lines 108 and 109 for motor 62. However, said relay 78 has a relatively long release period, being designed to hold contact 107 open for one second after de-energization of its circuit upon opening of switch 91. Inasmuch as the sending of the positive pulses from the central station is spaced to occur within some shorter period, such as one-half second, the switch 107 will normally stay open between completions of the three-second cycles of motor 55. However, when no further pulses are sent to the transmitter and therefore the re-energization of relay 78 does not occur in a period of one second, then switch 107 will close. This transmits current to motor 62, the switch 94 of which remains closed with the cam 64 having made only one-half its 180° rotation. Thereupon motor 62 rotates until arm 61 has completed its 180° sweep, whereupon switch 94 is opened by cam 64 and the entire transmitter in apartment #1 has completed its work.

As will now be apparent from the construction of the Receiver Selector relay, switch arm 27 will be moved step-by-step, by means of successive positive pulses from the survey office until all the contacts 30, 31, 105, etc. through 115, corresponding to all the receiver sets in all the apartments in the building, are successively connected. In the example shown in connection with building No. 1, it will be apparent that the Receiver Selector relay is provided with a greater number of contacts in the outer ring of the step switch than is necessary to serve the 12 receivers in the four apartments of that building. Thus contact 115 is the last of the live contacts in that ring, although at that point the switch arm 27 would have described only a portion of its 180° arc of travel.

Means are provided for continuing rotation of switch arm 27 across the inactive contacts 116 until the full 180° sweep has been completed so that the switch arm and the Receiver Selector relay will be in position for a repeat operation whenever called for. For this purpose there is provided an inner step-switch arm 117 rotatable with arm 27 and a concentric series of contacts in the path thereof. A wire 118 connects arm 117 with a pole 119 of an interrupter switch having a vibrator switch plate 240. The opposite pole of said switch is connected by wire 241 through line 22 to one terminal of the coil of solenoid 24. Current is supplied to the solenoid through battery 23 and line 21 to that set of contacts 243 corresponding in position with the dead contacts 116 in the outer ring. Thus when switch arm 27 has reached contact 115, the next positive pulse in line I will move switch arm 117 to contact with the first live contact of group 243. Thereupon solenoid 24 will be energized to actuate the interrupter switch 240 and advance the rotary switch arms 27 and 117 throughout the remainder of their sweep until the 180° position is reached, whereupon the arms' opposite terminals 27' and 117' will be in position of readiness to begin another cycle.

Figure 4:
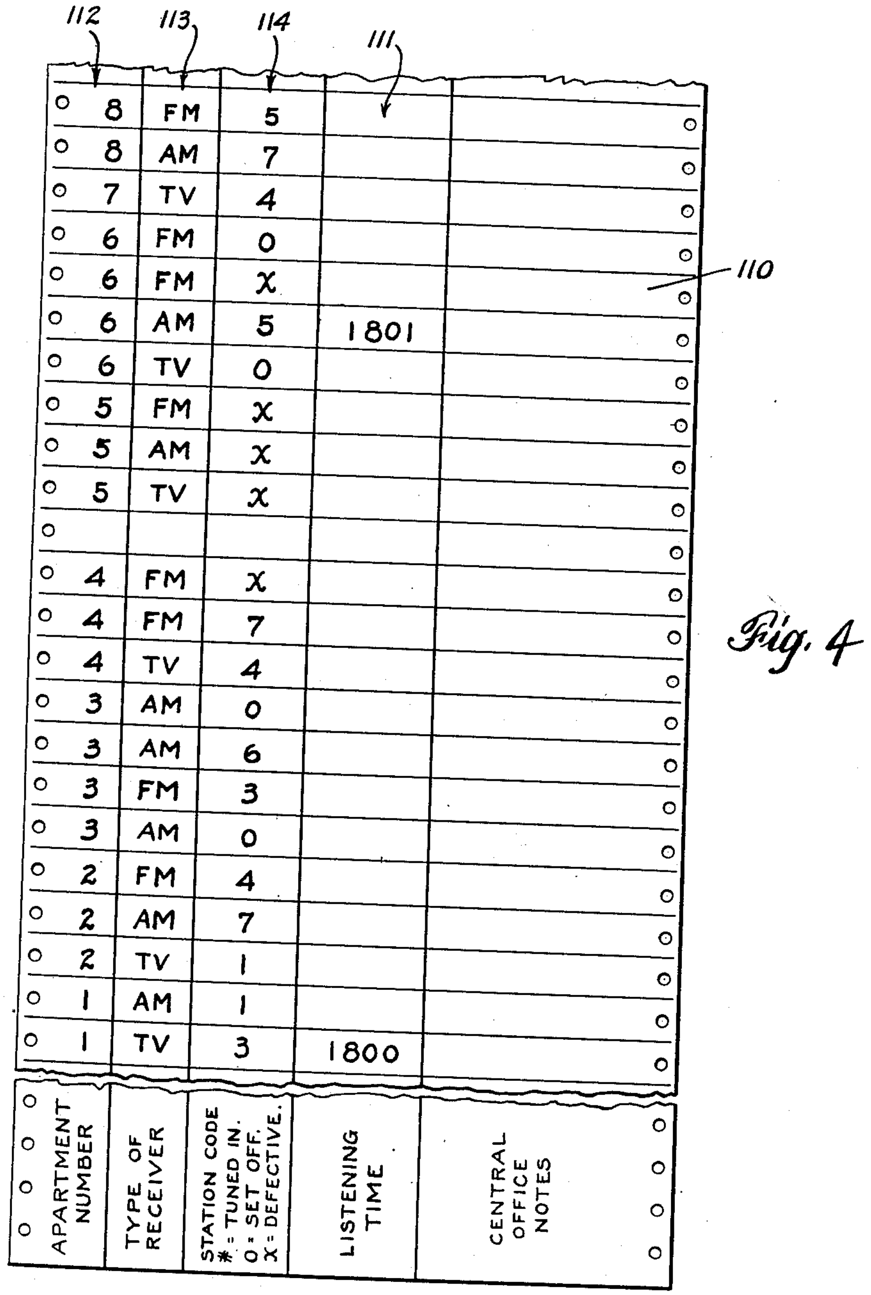
Fig. 4 is a fragmentary plan view of a typical series of records produced by the invention in the embodiments of Figs. 1 to 3 inclusive.

Referring now to Fig. 4, there is shown a portion of a typical record strip produced at the survey station. Said record is produced on an edge-perforated web 110 adapted to be fed lengthwise chronologically at 3½ second intervals. In column 111 the time of recording is printed in minutes according to the 24 hour system. In the left-hand column 112 there appears a code indicating the number of the apartment being checked. In column 113 appears the identification of the type of receiver and in column 114 the condition and setting of the receiver. Thus, considering the bottom line, at time 1800 the television receiver in apartment #1 is indicated to have been tuned to channel No. 3, all as described above. During the next scanning cycle the AM radio receiver in apartment #1 is indicated to have been set at band 1. Thus automatically each set in each apartment is scanned and its setting indicated at the time of such scanning. The indication O means that the set was turned off, this indication corresponding to the number of pulses sent out when the switch arm 46 makes contact with the complete series of contacts 47 as previously described. If, on the other hand, a circuit is broken or not operating, or defective for some reason, no pulses will be received from the transmitter and this condition is indicated by the symbol X.

Figure 2:
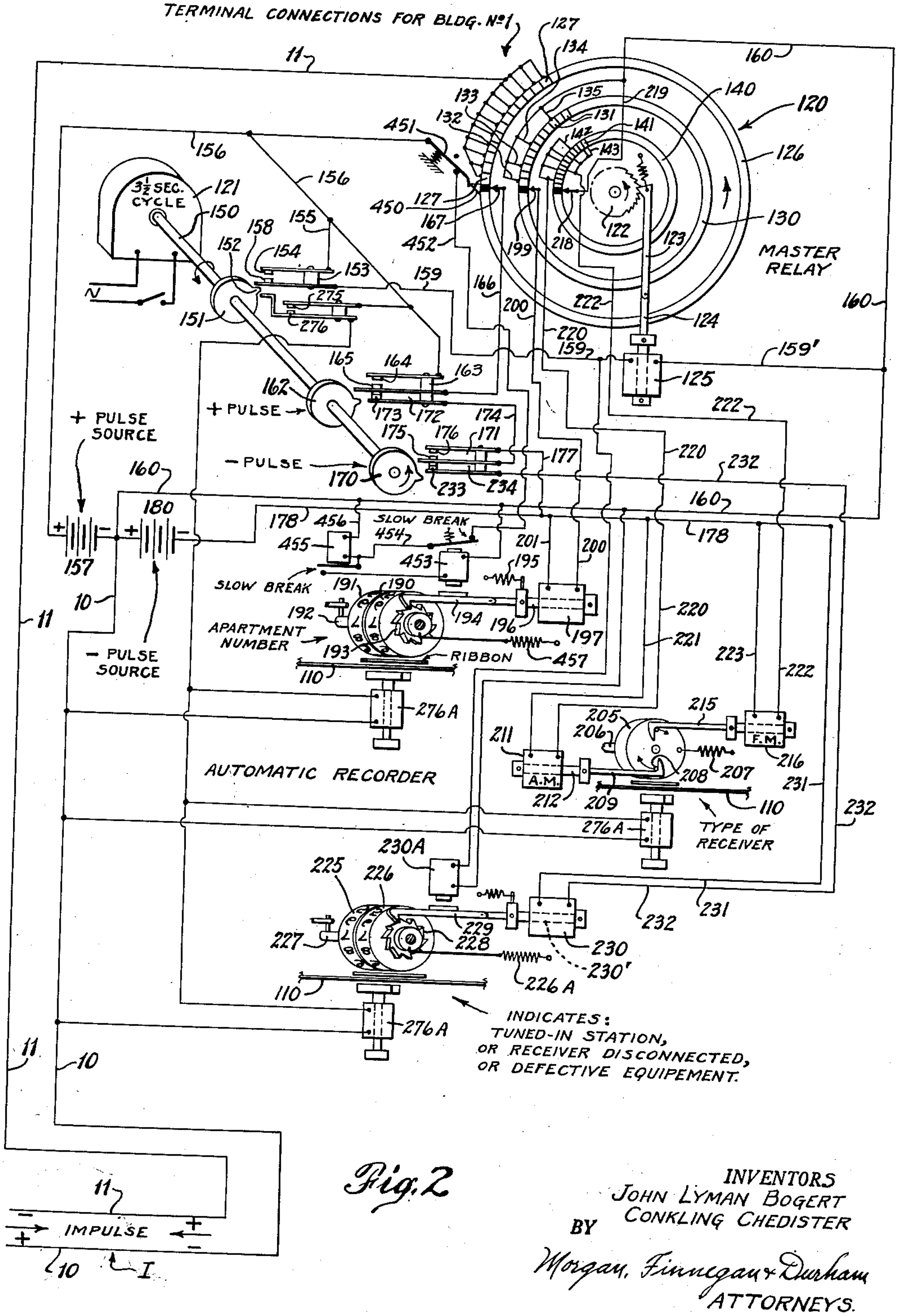
Fig. 2 is a diagrammatic view of the master relay and the automatic recorder in the survey office in the system illustrated in Fig. 1.

Referring now to the Main Survey Office equipment diagrammatically shown in Fig. 2, same consists of two principal units as indicated in Fig. 1, that is, the "Master Relay" and the "Automatic Recorder." The elements of the Master Relay are shown in the upper part of Fig. 2 and consist primarily of the rotatable contact drum 120 and the switch controls operated from cyclic motor 121. Drum 120 is adapted to be rotated step-by-step by means of ratchet wheel 122 moved by pawl 123 at the end of rod 124. Said pawl is adapted to be actuated through one stroke upon each energization of solenoid 125. The external ring or periphery 126 is provided with groups of separate contacts 127, the group corresponding to the terminal connections for building No. 1 being the only one shown. Thus there are twelve such contacts 127 in the group for building No. 1, corresponding to the twelve live contacts 30, 31, 105, etc., 115, shown in the Receiver Selector relay for building No. 1, and thus corresponding to the twelve receivers in that building. The group of contacts 127 for building No. 1 are connected in parallel to wire 11 of telephone line I. An intermediate or secondary ring 130 on drum 120 is also provided with a group of twelve contacts 131, and said contacts are arranged into sub-groups of two, three, four and three contacts, corresponding respectively to the groups of receivers in apartments #1, #2, #3, and #4. Circuit wires 132, 133, 134 and 135 lead from said four respective sub-groups of contacts, said wires corresponding to the lead wires 1, 2, 3 and 4 leading from the Receiver Selector relay in building No. 1 to the four apartments.

The innermost or third contact ring 140 is provided with a group of contacts 141, some of which correspond to AM sets and are connected in parallel by circuit wires 142; others of which correspond to FM sets and are connected in parallel by circuit wires 143; while still others are blank contacts and correspond to television sets.

As shown, the Master Relay also comprises a cyclic switching control, based on the 3½ second cycle of synchronous motor 121. A plurality of timing cams are mounted on shaft 150, driven by said motor 121. The first of said cams, 151, is designed to time the control pulses to the Master Relay drum 120, so as to rotate it one step at the beginning of each 3½ second cycle. For that purpose the node 152 on the cam is designed to close momentarily the normally open switch 153. Contact 154 of said switch is connected by lines 155 and 156 to one terminal of battery 157, the other terminal of said battery being connected to line 160 as well as to line 10 of the telephone line I. Contact 158 of switch 153 is connected by line 159 to the coil of drum-operating solenoid 125. Lead 159' connects the other end of said coil to line 160 which is connected to the negative pole of battery 157. Thus it will be seen that the temporary closing of switch 153 will send a pulse from battery 157 to energize solenoid 125 and advance drum 120 one step, that is, corresponding to one notch of ratchet wheel 122.

Next in sequence of operation is the setting up of the circuit for transmitting a positive pulse over line I to move the rotary stepping switch arm 27 of the Receiver Selector relay. For this purpose cam 162 is mounted on shaft 150 to operate normally open switch 163 momentarily, immediately following the operation of switch 153. Contact 164 of said switch is connected by line 156 to battery 157, while the other contact 165 of the switch is connected by line 166 to stationary radial contact 167 which engages the contacts 127 on the outer ring 126 of the Master Relay drum. Thus when contact 167 engages the first segment of group 127 (upon the first step of the Master Relay) the closing of switch 163 will send a positive pulse from battery 157 over line I, thereby to close switch 19—20 and move contact arm 27 its first step and into engagement with contact 30, as previously described.

The invention next provides for transmission of a negative pulse over line I to initiate the first cycle of the Transmitter so as to scan the tuner position of the TV set in apartment #1. Accordingly a third cam 170 is mounted on motor shaft 150 to close switch 171 momentarily, immediately following the operation of switch 163. Circuit through line 11 of telephone line I is established via contact 127, contact 167, line 166 and the normally closed contacts 165 and 173. Line 174 connects contact 173 with the movable contact 175 of switch 171. Line 177 connects contact 176 with lines 177 and 178 leading to negative pole of battery 180, the opposite pole of which is connected with the terminus of telephone line 10. Accordingly, when switch 171 is closed by movement of cam 170, a negative pulse from battery 180 passes through line I to the Receiver Selector relay, said pulse being opposite in polarity from that of the pulse previously transmitted over the same line from battery 157 because the two batteries are arranged with their poles in opposite senses with respect to line 10.

The invention provides various settable printing instrumentalities in the Automatic Recorder unit (Fig. 2) for printing the various columnar indicia on the record web or tape, as shown in Fig. 4. As shown, the web 110 may be mounted for longitudinal feed movement on conventional sprocket feed rollers (not shown). The feeding movement, which is from right to left in Fig. 2, is step-by-step, the web being moved one step, corresponding to the longitudinal spaces indicated in Fig. 4, each 3½ seconds, corresponding to a scanning cycle. Such cyclic feeding movement may be imparted to the feed rollers by a suitable synchronous drive (not shown) from motor 121. A time-recording printer driven by suitable clock mechanism may be provided to print the time at desired intervals in column 111 of the web. Said clock mechanism and the printing actuating means therefore constitute no essential part of the invention and are not shown herein.

As indicated in Fig. 4, the apartment numbers are successively printed in column 112 as each receiver therein is scanned for tuning position. The means for automatically printing said apartment numbers comprises a pair of sequential numbering wheels 190 and 191 mounted on shaft 192 and adapted to be positioned step-by-step in numerical relation by means of ratchet wheel 193 on said shaft. The pawl 194 for rotating said ratchet is normally held in proper position for actuating the wheel by spring 195 and is coupled to the armature 196 of solenoid 197, so that each energization of said solenoid will retract the pawl and advance the ratchet wheel and numbering wheels one step.

The embodied means for automatically energizing solenoid 197 to set the numbering wheels according to the appropriate apartment number comprises a group of segmental contacts 131 on the intermediate ring 130 of drum 120 of the Master Relay. A stationary contact 199 is positioned to engage said contact segments 131, while wire 200 leads from said contact to one terminal of the coil of solenoid 197. The other terminal of said coil is connected to battery 180 by wires 201 and 178. Communication with the opposite pole of said battery is established through branch line 132 to line 160. Thus when the Master Relay drum has moved through its first step, the circuit will be closed to move pawl 194 one stroke and thereby set the numbering wheels to print the figure 1 to indicate apartment #1.

When the Master Relay drum has advanced through its second step, contact 199 will engage the second one of the group of contacts 131, but as said second contact has no communication with line 160, solenoid 197 will not be energized, and so apartment #1 will again be indicated as shown in Fig. 4. On the third step movement of the drum 120, contact 199 engages the third contact of group 131 and then current will pass through branch 133 to line 160 and the numbering wheels moved to indicate apartment #2. In similar manner the other apartment numbers will be set up in the numbering wheels in succession after each of the receivers has been scanned in the preceding apartment, the numbers thereof varying according to conditions and the locations of the various branch wires 133, 134, and 135, etc. being varied accordingly.

All of the apartments provided for by contacts 131 on drum 120, as well as possible additional ones, are indicated on numbering wheels 190, 191 by successive stepping of these wheels in units of one step as each live contact 131 cuts into and completes a circuit to solenoid 197. Thus the code numbers of the apartments run consecutively from 1 on up regardless of what number of building they are in. Therefore, the only time wheels 190, 191 have to be reset to their starting position is when all apartments in the system have been scanned and it is desired to start operations again by scanning apartment #1.

Resetting of wheels 190, 191 is designed to take place at the end of one complete revolution of drum 120, and to this end a cam point 450 is provided on drum 120 at the dead or starting position of said drum. A switch 451, adapted to be closed by cam point 450, is in a circuit leading from battery 157, line 156, line 452, normally closed armature of relay-electromagnet 453, line 454, relay 455 and its armature, line 456 and line 160 to battery 157. Relay-electromagnet 453 is so arranged with respect to pawl 194 of numbering wheels 190, 191, that when it is energized, the pawl is released from its ratchet, and the spring 457 and associated band and drum of wheel shaft 192 will cause the wheels to return to starting position. Relays 453 and 455 are so designed and arranged in the circuit that relay 453 is only energized long enough to hold pawl 194 off its ratchet a sufficient time to permit resetting even though switch 451 remains closed as long as drum 120 remains in its starting or "home" position.

Printing means are provided for indicating the types of receivers being scanned in the various apartments, the three types being TV, AM and FM as previously described. For this purpose a printing wheel 205, having three positions and three sets of indicia corresponding to the three types of receivers, is mounted on shaft 206 in line with column 113 of the web. The printing indicia on said wheel are positioned so that when the wheel is in the normal position shown in Fig. 2, the letters TV are lowermost and in printing position; while if the wheel is rocked through an appropriate angle clockwise, the letters FM will be in printing position; while if the wheel is rocked at a greater angle clockwise the letters AM will be in printing position. The wheel is normally held in the TV printing position by a spring 207. The embodied means for rocking the wheel to the AM printing position comprises a pin 208 on the face of the wheel which is engaged by the hooked end of a rocking bar 209, said bar being normally held in neutral position by the spring 207, but actuated to turn the wheel clockwise by energization of solenoid 211, to the armature 212 of which the bar 209 is attached. In similar fashion the wheel may be rocked clockwise to the FM printing position by bar 215 through energization of solenoid 216.

The Master Relay drum carries means for controlling the position of printing wheel 205 in accordance with the type of receiver being scanned. Stationary radial contact 218 engages segmental contacts of the group 141 on the inner ring 140 of the drum. Contact 218 is connected to battery line 160 by line 219. Certain of the contacts 141, which correspond to TV receivers, are dead or neutral so that no current is transmitted through them and thus printing wheel 205 remains in the neutral or TV printing position whenever such neutral contacts are engaged by contact 218. This is the case in connection with the first segment of contacts 141 as indicated in column 113 of Fig. 4. The second and certain other segments of group 141 are connected by wires leading to line 220 which is connected to one end of the coil of solenoid 211. The other end of said coil is connected to line 178 and battery 180 by line 221. Thus when any of the segmental contacts 141 so connected engage contact 218, the printing wheel 205 is rocked to the AM printing position. Correspondingly other segments of the group of contacts 141 are connected to line 222 and thus effect energization of solenoid 216, the coil thereof being connected to line 178 by line 223.

We come now to the embodied means for setting up for printing the indications of the tuning positions of the various receivers scanned by the mechanism of the invention, said means being responsive to the negative pulses sent out from the tuner scanning switch 45 in the apartment-located transmitters. As embodied a pair of numbering wheels 225 and 226 mounted on shaft 227 are adapted to be positioned by ratchet wheel 228 and pawl 229. Numbering wheels 225 and 226 are normally biassed to starting position by a spring 226A which acts upon the wheels through a flexible band secured to a drum mounted on wheel shaft 227. An electromagnet 230A is arranged to raise pawl 229 off ratchet wheel 228 when energized by the closing of switch 153 at the beginning of the cyclic operation of motor 121, thus allowing the numbering wheels to return to their starting position. Solenoid 230 has its armature 230′ connected to actuate the pawl 229 through one stroke upon each pulse-energization of the solenoid. One terminal of the solenoid coil 230 is connected to battery line 178 by line 231, while the opposite terminal of said coil is normally in circuit with line 11 of the telephone line I through contact 167 of the Master Relay. This latter circuit comprises line 232 which connects with the fixed terminal 233 of normally closed switch 234. The other terminal 175 of said switch, as previously described, is connected through normally closed switch 172 and thence by line 166 to contact 167. Thus when contact 167 is in engagement with the initial segment of contact group 127, solenoid 230 will be in circuit with the transmitter of apartment #1 and in position to receive the negative pulses transmitted over line I from said transmitter and battery 180 as it successively scans and sends out the pulses corresponding to the tuning position of the several receivers therein, as previously described.

Also as previously described, the number of negative pulses sent out by transmitter for apartment #1 when scanning the tuned position of the selector dial for the TV receiver will be three, corresponding to the third station or tuning position 37c, to which the selector switch arm 36 is shown to be set. Thus the three pulses so transmitted over line I will be imparted to solenoid 230 and will advance printing wheel 226 three steps so that the figure 3 will be printed in the appropriate place in column 114 as indicated. In similar manner, when the Master Relay drum has moved to the second position, and after the wheel 226 was reset to starting position, the scanning pulses from the transmitter in apartment #1 will be transmitted to set printing wheel 226 to indicate the appropriate code number for the dial setting of the AM set therein, indicated as 1 in Fig. 4. In cases where the receiver is not turned on, the number of pulses sent out by the transmitter will result in setting the printing wheel 226 to print zero, as previously described, this being the result of transmitting the total number of pulses from full sweep of the scanning switch 45. In cases where, for some reason, such as a defective circuit, no pulses are transmitted to the solenoid 230, the printing wheel 226 will remain stationary and in such case the symbol X will be printed as indicated in Fig. 4.

Means are provided for recording the assembled data by printing of the data on paper after the various type wheels have been positioned. To this end, contacts 275 and 276 of a switch are provided to be operated by cam 151. Contacts 275 and 276 are so oriented with respect to node 152 as to be closed for a short time just prior to the closure of switch 153. Contacts 275 and 276 control solenoids 276A, or other means associated with each of the three sets of numbering wheels for causing actual printing impression upon the paper 110. Thus the printing is accomplished at a time when all the information is stored in the various type drums.

It will be understood that other apartment houses or buildings can be linked up to the Master Relay by additional telephone lines II, III, etc. and appropriate sets of contacts placed on the three rings of drum 120 so that the Receiver Selector relays in the successive buildings and the various transmitters and receivers in the separate apartments can be successively linked up and scanned by successive positional movements of the drum 120. Thus as shown, the terminal connections for building No. 1 occupy one-eighth of the periphery of the drum so that a total of 8 buildings containing 32 apartments and a total of 128 television and/or radio receivers could be served by the drum in the example shown. Obviously the number of terminal connections accommodated by such a drum can be varied with the diameter of the drum, while, more conveniently, multiplication of the units served by such a Master Relay can also be effected by providing a plurality of drums in series for sequential operations. Also while in the examples shown a maximum of four receivers per apartment transmitter is illustrated, an indefinitely greater number of such receivers could be served by a suitably equipped transmitter.

While the embodiment of the invention is shown and described as adapted for continuous sequential scanning and recording, it will be understood that the recorder may be stopped at any time, preferably at the end of a 3½ second scanning cycle, and operation resumed when desired. Also it is not necessary that every building or every transmitter be connected or scanned in sequence, as means (not shown) may obviously be provided for by-passing selected buildings or transmitters or individual receivers, as and when desired.

In adding on buildings, it is only necessary to have corresponding contacts 27 of the next group for building 2 connected to the wire of line II corresponding to wire 11 in line I. The other wire of line II may be connected to wire 10. It is possible to provide manual switches for substituting the two wires of any telephone line for wires 10 and 11 of line I.

The 3½ second cycle of motor 121 is set somewhat longer than the 3 second cycle of motor 55 in each apartment transmitter. Hence for each new cycle of motor 121, the various cams, motors and relays will be in readiness for such new cycle.

To summarize the sequential operation of the entire system shown in Figs. 1–4 inclusive, we may start with motor 121. This motor is started. Cam 151 operates drum 120 to step it forward. This cam also clears type wheels 225, 226 to start. Thus the entire master relay station is ready. Wheels 190, 191 and 205 are positioned by drum 120.

Next, cam 162 sends a positive pulse to the particular apartment transmitter determined by the setting of drum 120. This positive pulse readies the transmitter.

Then cam 170 starts the transmitter scan cycle with a negative pulse. At each apartment each selector switch will have been positioned or conditioned for off, on and station. Station scan wiper 46 will start a 3 second cycle, transmitting negative pulses during an active station hunt period. Set scan wiper 61 will keep the scanning restricted to a certain class of receivers. The station scan negative pulses advance type wheels 225, 226.

Just before the end of the master relay cycle (the apartment transmitter cycle will have been terminated), cam 151 will pulse the printing solenoids 276A.

The next complete cycle will advance drum 120 and also receiver-type scan wiper 61. It is clear that motor 62 and switch 60 may be replaced by a stepping switch having a four step range and polarized to respond only to positive pulses. Thus a positive pulse will advance wiper 61 from one segment to the next.

Another embodiment of the invention is shown in Figs. 5 to 9 inclusive of the drawings, the system therein illustrated being simplified in certain respects over that just discussed in connection with Figs. 1 to 4. In the embodiment now to be described, the mechanism is simplified to the extent that only one type of receiver is sensed or scanned and the results recorded, and such a receiver might, of course, be either AM or FM radio or television. This embodiment of the invention provides for installation of equipment at central offices of the telephone company, the wires of which are used in the system, and less comprehensive equipment at the dwelling or apartment where the receiver or receivers are located. Mechanical cam means are utilized at the receiver transmitters or scanning equipment for synchronizing the serial scanning of the receivers, and there is thus eliminated the need at the main survey office for the receiver selection apparatus in the first embodiment already discussed. The embodiment of the invention disclosed in Figs. 5 to 9 inclusive, provides for considerably greater flexibility and ease in adding new receivers to the system.

Fig. 5 shows a schematic layout of the modified embodiment of the invention illustratively showing the main survey office where control and recording equipment is located connected to each of three central offices of the telephone company where other equipment is conveniently located. Each of the central offices 1 and 2, as shown, are connected by individual cables to a terminal block in the basement of eight apartment houses, from which connections go to receivers in five apartments of each house. The third central office is shown as similarly connected to only four apartment houses each with five apartments with receivers connected to the system, the total system illustratively shown having survey connection with one-hundred receivers in twenty apartment buildings.

Turning now to a detailed description of the modified embodiment of the invention, and referring first to Fig. 6, the A. C. synchronous motor 301 in the survey office runs continuously to drive cams 302, 303 and 304 in counter-clockwise rotation. Notches on the cams operate switches 305, 306 and 307 in that order in successive time intervals during each revolution of motor 301, which takes about 1¼ seconds. Each revolution of the cam shaft surveys, records, advances the tape, advances the ribbon, resets channel indicator wheel to zero, and moves the apartment house selector switches one step for each TV set scanned (or other type of receiver, as the case may be). In the system shown (see Fig. 5), there are five apartments in each apartment house; there are eight apartment houses cared for by each of two central offices, and four apartment houses cared for by telephone central office #3; this being a total of one-hundred apartments (equivalent to one-hundred TV sets). Five revolutions of motor 301 take place to scan and record five TV sets in each apartment house.

*Sequence of events during first revolution of motor 301*

At the start of operation, switch 307 for cam 304 is open, the opening of this switch representing the end of the previous operation. Switch 305 is first closed by the notch in cam 303 to send a short current impulse to apartment house #1. The current runs from the plus side of a suitable battery in the survey office, as schematically indicated, through normally closed contact of relay 355, closed upper contact 305B of switch 305, line 309, arm of selector switch 311 to contact #1 of signal bank 310, thence by line 312 to telephone central office #1 and through the wiper to contact #1 of stepping switch 313 (Fig. 7). This #1 contact and ground is connected through terminal block 314A to a terminal block 314 (Fig. 8) in the basement of apartment house #1 having apartments (or TV sets) #1, #2, #3, #4 and #5. A line 317 from block 314 connects to a transmitter in each apartment and energizes each of the five relays 315 (Fig. 8) through its normally closed relay contact B. Return lines from relays 315 connect to blocks 314 and thence to ground (or minus side of the battery in the survey office).

As each relay 315 operates (Fig. 8), it first closes its contacts A and C, and slightly later opens contact B. Closing of contact A sets up holding circuit for each relay 315 from the plus side of a transmitter battery through normally closed upper contact 316B of each switch 316, closed relay contacts A of relays 315, relay coils 315 to grounded minus side of the battery. Contacts C of relays 315, now closed, complete an A. C. house current circuit which starts the cam motor 318 in each of the five transmitters in apartment house #1. Contacts B of relays 315 then have their delayed opening, but relays 315 are held by holding circuit through contacts A and the local battery connected to contact 316B, thus being isolated from and independent of the first impulse circuit through line 317.

The first impulse from the closing of movable contact 305 against upper contact 305B which energized relays 315 (as just described) and caused motors 318 to start, sends a current impulse from line 317 through switch 321 (Fig. 8), normally closed contact C of relay 324, the common line to point 1 and each alternate point of rotary sweeping switch 325, arm of switch 325, to the coil of relay 322, energizing it, and thence to ground (minus side of battery at survey office). Energizing of relay 322 closes its normally open contacts A and B. Closed contact A completes a relay holding circuit from a battery through normally closed contact of relay 329. Closed contact B of relay 322 completes an A. C. house current circuit to start rotary switch motor 328 which rotates the double arm of rotary switch 325 in a continuous sweep clockwise over all its contact points until the last point is met. This point serves to open the circuit to motor 328 and stop it.

Motors 318 in all five transmitters of apartment house #1 are now running, and motor 328 in apartment #1 is running, but motors 328 in apartments 2, 3, 4 and 5 are not yet running because the corresponding cams 320 associated with switches 321 in apartments 2 to 5 inclusive have not yet closed these switches, due to different phase positions of the notches in all cams 320. Thus, immediately after cam 320 in apartment #1 opens its switch 321, the cam 320 in apartment #2 closes its switch 321, etc. in successive order until finally the cam 320 in apartment #5 closes its switch 321.

The following description applies to apartment #1 and its TV set which is assumed as tuned to channel 5. Point switch 330, which is turned with the tuner knob, has its movable contact arm on switch point 5 which is connected to point #8 of rotary switch 325. Motors 318 and 328 start running as soon as relay 315 is energized. Motor 301, in the survey office, makes one revolution to scan or survey one TV set; motor 318 in each apartment makes ⅕ revolution during this same time and motor 328 makes ½ revolution during the same time span, thus sweeping one arm of switch 325 over all its contact points and bringing its other arm to the starting position at point #1.

Motor 301, in the survey office, advances cam 303 and movable contact 305 breaks from upper contact 305B and closes against lower contact 305A. This terminates the first impulse from the survey office to apartment house #1 and readies a circuit to receive impulses from the five apartments in house #1. Relay coils 315 and 322 are, of course, now energized through their holding circuits.

The arm of rotary switch 325 moves to point #2, and since this is connected to a dead point in the TV set, nothing happens. The moving arm then contacts point #3, and an impulse is sent to the survey office to step the channel indicator wheel 338 (type wheel) from 0 to 1 via the following circuit: from the plus side of battery (in transmitter #1) through normally closed contact of relay 329, closed contact A of relay 322, line to arm of rotary switch 325, point #3 of said switch, the jumpers connecting odd numbered contacts up to 23, contact C of non-energized relay 324, switch 321 (still closed), line 317, blocks 314 and 314A through contact point 1 and the wiper of switch 313, along wire 312 to contact 1 and the arm of signal bank 310 of switch 311 (Fig. 6), line 309, contacts 305A and 305, normally closed contact B of relay 308, to relay 326 and thence to ground (or minus side of battery at survey office). The resulting energization of relay 326 closes its contact and supplies one impulse from the battery to rotate the channel indicator wheel solenoid 327 one step, from "0" to "1."

The continuing rotation of the arm of rotary switch 325 moves it from point #3 to #4 which again represents a dead point in the TV set.

At this time the rotation of cam 319 driven by motor 318 snaps the micro-switch movable contact 316 away from upper contact 316B and closes it against lower contact 316A. This action is fast enough not to affect relay 315 and motor 318, and sets up a new holding circuit for relay 315 direct from battery through contacts 316 and 316A and the winding of relay 315. This action assures the continued running in transmitter #1 of motor 318 after its rotary switch 325 has completed its scanning cycle and until the motors 318 in all four additional transmitters have also completed their respective cycles. At the completion of each respective cycle, each of the five contacts 316 reverses its contacts (breaking the lower and making the upper), and thus de-energizes all relays 315. This action of contact 316 also compensates for possible slight out-of-phase relation between the five motors 318, since each motor is controlled by its own switch 316, and is brought to its starting position by the accurately positioned notch in cam 319. The effective part of one revolution of motor 318 is 72° (⅕ turn) during which time the transmitter, in which it is disposed, is being scanned.

Returning now to the action of rotary switch 325, its wiper continues its sweep and each contact with an odd numbered point sends a return impulse to the survey office to advance the channel indicator wheel one step. The circuit for this action is the same as that described for point #3 in a preceding paragraph.

When the wiper of switch 325 reaches point #8, which is connected to the channel #5 point in the TV set, a circuit is set up which blocks the sending of any more impulses to the survey office and leaves the channel indicator wheel now set at the figure 3. This figure is the code number arbitrarily assigned to channel #5, the station to which the TV set is actually tuned. The circuit involved in arresting further impulse sending is as follows: from the plus side of battery through the closed contact of relay 329, closed contact A of relay 322, line to wiper of switch 325 and point #8, line to point #5 (channel in tune), wiper of TV set selector switch 330, line to contacts 331 (which are closed, when the set is turned on, by relay 332), line to winding of relay 324, through the winding and thence to grounded minus side of battery. Energizing of relay 324 closes its contacts A and B, and opens C. Closing of contact A sets the relay 324 holding circuit from battery through the contact of relay 329; closing of contact B prepares a circuit for the ending of the scanning operation or cycle of rotary switch 325, opening of contact C of relay 324 breaks the circuit over which impulses, up to now, were being sent to the survey office channel indicator wheel mechanism (i. e. relay 326).

All of the interconnected, alternate, odd numbered points on switch 325, except the last one (#25), are now dead because contact C of energized relay 324 is open, and all of the remaining, alternate, even numbered points, except the next-to-last, are dead because none of them is connected to a tuned-in station point on the TV selector switch 330. Therefore, no further impulses are sent to relay 326 from transmitter #1 in apartment #1.

Assume now that the wiper of switch 325 has reached the next-to-last point (#24). This point is connected to relay coil 324 but, since this coil in the conditions now assumed, is already energized, nothing further happens. The purpose of this next-to-last point (#24) is to allow the full quota of possible impulses to be sent to the survey office before relay 324 is energized if it has not previously been energized, thus indicating that the TV set was not turned on (relay 332 not energized and its contacts 331 therefore open) or it was tuned to some station not provided for in the selector switch 330.

The wiper of switch 325 now reaches the last point (#25) and energizes relay 329 from battery through its (relay 329) own contacts, through contact A of the still energized relay 322, line to the wiper of switch 325 and the last point thereon, thence to closed contact B of energized relay 324, then through the coil of relay 329 to ground. When energized, relay 329 opens its normally closed contacts and de-energizes its winding to close its contacts again since the contacts are a part of the relay 329 energizing circuit. However, during the time the contacts of relay 329 are open, the relays 322 and 324 are de-energized and hence motor 328 stops (contact B of relay 322 opens) and the wiper of switch 325 comes to rest as shown with one end on the last contact point and the other end on the first contact point ("home" position). When or immediately after the wiper of switch 325 stops, the switch 321 is opened by its cam 320, which, however, still continues to revolve because relay 315 is still energized and motor 318 is therefore running. This may be obtained by having cam 320 provided with a drop having an angular extent of about 80°. Assuming motors 318 and 328 run synchronously, cam 320 will go through 72° in the time for one wiper of switch 325 to go 180°. It is understood that motors 318 and 328 are geared down.

The scanning of apartment #1 of house #1 is now completed, but the recording of the result must be described and the stage must be set for shifting the activities for scanning of apartment #2 in the house #1. Referring again to the survey office (Fig. 6), the motor 301 has by this time (i. e. at the instant that arm of switch 325 comes to rest) advanced cam 302 so that its notch closes switch 306. This energizes printing solenoid 333 which effects the printing of the proper character presented on the channel wheel indicator upon a recording tape. Its position on the tape is in alignment with a pre-printed code number on the tape which represents the apartment and apartment house which has just been scanned. Printing solenoid 333 is energized by current from the battery at the survey office through closed contacts of relay 355, switch 306, coil of solenoid 333, thence back to the battery (through ground).

Switch 306 is now opened and shortly thereafter switch 307 is closed by the respective cams 302 and 304. Closing of switch 307 energizes relay 334 through lines 341 from the battery at relay 355, thus closing the contacts A, B and C of relay 334 and completing circuits which activate, respectively, the tape feed coil 335, the ribbon feed coil 336, and the channel indicator wheel resetting coil 337. These three circuits may all derive their current from the battery.

It should be noted here that energizing of the three relays just mentioned, as well as all other stepping relays, merely prepares them for performing their final function; the actual function is performed by a spring when the relays are next de-energized.

Closing of switch 307 also closes a circuit through line 341 to energize solenoid 339 of stepping switch 340 which, upon solenoid de-energizing, advances the wiper of switch 340 from point #1 to #2. The "live" line 341 also leads through the wiper of switch 342 to its contact point #1 which in turn is connected to the wiper arms of both levels of bank 1 of switch 340. However, since the wiper of switch 340 is on an unconnected point on its lower level and on no point at all on its upper level, no action is instituted at this time.

The opening and closing of interrupter switch 361 (associated with solenoid 339) as caused by energizing and de-energizing of solenoid 339, at this time, effects no change, as reset relay 358 is not energized.

Switch 307 is now opened by its cam 304, and relay 334 and solenoid 339 are de-energized, and the actions they control take place as follows: for relay 334, the tape is advanced one step, the ribbon is advanced one step, and the channel indicator wheel is reset to 0 by the de-energizing of reset coil 337; the arm wiper of lower level bank 1, switch 340 moves from point #1 to point #2 and in doing so, closes contacts A and B of off-normal switch 360 by means of an arm 362 attached to the shaft which carries the wiper arms of switch 340. Closing of switch 360, at this time, effects no change, since reset relay 358 is not energized.

Immediately after switch 307 opens and before contact arm 305 shifts from its lower to its upper contact, the switch 321 in transmitter #1 of apartment #1 is opened by cam 320, and switch 321 in transmitter #2 of apartment #2 is closed. Motors 318 in transmitters 1 through 5 continue running, and switches 316 maintain their lower contacts closed, thus keeping relays 315 energized.

Briefly, the system disclosed in Figs. 5 to 9 inclusive operates as follows. Motor 301 starts to run and first operates on switch 305 to start a group operation of all scanners in an apartment building. This may be considered as a sub-station. All motors 318 in one such sub-station start simultaneously, and stop substantially simultaneously.

The phasing of cams 320 is such that each receiver station scan cycle is sequentially arranged with respect to other receiver scan cycles in the same apartment building (or other grouping). Thus a group cycle is initiated by switch 305, the individual receiver scan cycles sequentially following. The number of receivers in one group will be small enough so that motor 301 will remain in substantial synchronism with the various motors 318 in one group. As a rule, the group cycle will be short enough so that any departure from synchronism will be inconsequential.

The first cycle is now complete, and the stage set for scanning of apartment #2 in house #1.

As motor 301 continues to run, cams 302, 303 and 304 will operate switches 305, 306, 307 in that order and repeat the cycle just described, thereby scanning the TV sets in apartments 2, 3, 4 and 5, and recording the results. It is now necessary to stop the motors 318 in all five transmitters by de-energizing relays 315, and then disconnect apartment house #1 in telephone central office #1 by advancing the wiper of switch 313 from point #1 to point #2 which serves apartment house #2. Therefore, just after the wiper of switch 325, in apartment #5, comes to rest on its last contact (and also on its first contact at the other end of the wiper) the cam operated switches 316 in all five apartments respectively shift from their lower to their upper contacts, thus de-energizing their respective relays 315 and stopping their respective motors 318. At the same instant that switch 316 in transmitter #1 acts to de-energize relay 315, the switch 321 closes thus putting it in normal starting position ("home" position) for a second scan cycle, at some future time, of the group of five transmitters in apartment house #1. The cams 320 in transmitters 2, 3, 4 and 5 also reach their "home" positions as the switches 316 in these transmitters act to stop motors 318, but, due to the different phase positions of the notches in these cams their respective switches 321 are open. The five transmitters are now all in their "home" positions as they were before the survey started, and are thus ready for the start of another survey at some future time.

In the survey office, at the time the survey for apartment #4 was completed and the switch 307 closed, an impulse to stepping solenoid 339 had caused the wiper of the lower level, bank 1 of switch 340 to come to rest on point #5.

Immediately after the switches 316 have shifted, as described above, the switch 307 is closed. This prepares relay 334 and associated relays 335, 336 and 337, and solenoid 339 (Fig. 6), to perform their previously described functions, and it also now energizes relay 344 in telephone central office #1 (Fig. 7) to effect the moving of the wiper of switch 313 from point #1 to point #2 which leads to apartment house #2. The circuit is as follows: From survey office battery (Fig. 6) through contacts of relay 355, switch 307, line 341, wiper and contact #1 of switch 342, wiper and point #5 of lower level, bank 1, of switch 340, line 430 to wiper and point #1 of control bank of switch 311, line 343 from just mentioned point #1 to coil of relay 344 in central office # 1 (Fig. 7), thence back to the battery (through ground). Energized relay 344 closes its contacts and energizes solenoid 345, which, when de-energized, will step wiper of switch 313 from point #1 to point #2. The opening and closing of interrupter switch 361 when solenoid 345 is activated has no effect at this time because reset relay 357 is not energized. Switch 307 (Fig. 6) now opens and the actions prepared for by relays 334, 339, in Fig. 6, and 344 and coil 345 in Fig. 7, take place as said relays are de-energized.

The fifth cycle has now ended. Five apartments have been surveyed and recorded. The stage is set to repeat the same events for the apartment houses Nos. 2 through 8 which are handled from central office #1. The fifth apartment (and TV set) in house #8 is the 40th set scanned from the beginning of the operation, and as its scanning is completed, the wiper of upper level, bank 1, switch 340 (Fig. 6) is resting on point #40; and the wiper of switch 313 (Fig. 7), in central office #1 is resting on its point #8. The switch 307, in the survey office, now closes, thus energizing relays 334, 339, as in previous cycles, but it now also energizes stepping solenoid 346 (Fig. 6) of switch 311 which, when switch 307 opens, will shift the wipers of each bank of switch 311 from the #1 point to the #2 point. Lines 347 and 349 are connected respectively to the #2 point of upper and lower banks of switch 311, and run to central office #2. The action of interrupter switch 361 of switch 311 effects nothing at this time. Arm 362 on the wiper shaft of switch 311 releases normally closed contacts A and B of switch 360 to close as the wiper moves from point 1 to 2, but nothing is effected at this time, since relay 358 is not energized. This switch closure is accomplished by arm 362 springing by contact arm B, thus momentarily opening contacts A and B even wider, and then freeing the contact arm of all restraint so that contacts A and B close. The wiper of switch 313 (Fig. 7) remains on point 8 (relays 344 and 345 were not energized this cycle) but will be stepped "home" at end of full operation.

The opening of switch 307 (Fig. 6) now takes place, and the various delayed actions ensue as the relays 334, 339 and 346 activated by the switch, are de-energized. The 40th cycle is thus completed and the survey office is connected through lines 347, 349, to central office #2 which is prepared to take care of 40 more TV sets contained in apartment houses #9 through 16.

Due to the fact that the two levels of bank 1 of switch 340 only have sufficient contact points to survey, or scan, 50 TV sets, it is necessary, at the end of the scanning cycle of the 50th set, to disconnect the wipers of bank 1 from line 341 and connect the wipers of bank 2 to this line. This is done by moving the wiper of switch 342 to its point #2 by means of stepping solenoid 353 of switch 342 which receives its activating current through switch 307, line 341, point #50A, bank 1, of switch 340 and line 351. Note that two contacts, 50 and 50A, are provided at the same spot on level 2, bank 1 of switch 340; point #50 connects to line 430 and 349 to step the switch 313 in central office #2 from point 10 to point 11, and point 50A connects to line 351.

As switch 307 opens, wipers of switch 340, bank 1, return to "home" position but are out of all circuits, wipers of bank 2 move to "home" position with the lower wiper on the first point (which represents the 51st TV set), and wiper of switch 342 moves to point #2 which is connected to wipers of bank 2 of switch 340. When the wiper of upper level, bank 2, of switch 340 reaches its fifth contact (which represents the 80th TV set) it is necessary to shift circuits from central office #2, which cared for apartment houses #9 through #16, to central office #3, which cares for houses #17 through 20. This is not the full capacity of central office #3, and to use said capacity it would only be necessary to add more levels to switch 340.

The shifting of circuits from central office #2 to #3 is the same as previously described for the change from #1 to #2 and involves moving the wipers of switch 311 from points 2 to points 3 by activation of solenoid 346 through line 345. The scanning of each apartment in the houses 17 through 20 now follows in order until the last, or 100th, scanning is completed. This means that the last five motors 318 have stopped, the relays 315 de-energized and the wiper of upper level, bank 2, of switch 40 is resting on its last contact #100.

The next event records the scanning result of the 100th TV set, and then resets all switches and circuits to their original or normal positions so that a completely new survey may be made of the same 100 TV sets just scanned. Switch 307 is closed by the still-running motor 301, causing the following actions: Relay 334 is energized and its contacts, A, B and C energize coils 335, 336 and 337, thus preparing for the moving of the tape from code #100 to #1; moving of ribbon; resetting channel indicator wheel to zero. Solenoid 339 is energized to prepare for moving all wipers of switch 340 from their last, or 100th position, to the first contact of home position. Interrupter switch 361 of solenoid 339 (Fig. 6) opens. Relay 308 is energized (ground through the winding of relay 308, a line to contact #100 of switch 340, the wiper to contact #2 of switch 342, its wiper to line 341, through contacts 307 to the movable contact of relay 355 and thence to the positive side of a battery), causing contacts C and B of relay 308 to open, and A to close. This stops motor 301 (leaving switch 307 in closed position); energizes relay 355 (from closed 308A contact), and causing line 356 to become a "live" line. The current thus delivered to line 356 energizes the three reset relays 358, reset relay 359 (Fig. 6) and the reset 357 (Fig. 7) (in each of the three central offices), thus closing their contacts A and B. It should be borne in mind that at this stage in the operation, all seven of the normally open switches 360 are in their "on" position.

The energizing of relay 355 (Fig. 6) as above noted, breaks the circuit through switch 307, and hence de-energizes relay 334, which, in turn, de-energizes the indicator wheel reset coil 337, thus resetting the wheel to zero; de-energizes the ribbon feed coil 336, thus moving the ribbon one step; de-energizes the tape feed coil 335, thus advancing tape from code #100 to #1 and opening its normally open switch 360 (by an arm 362 on tape advance shaft) which de-energizes reset relay 359. Interrupter switch 361 closes but affects nothing because relay 359 was de-energized. The breaking of the circuit through switch 307 also de-energizes solenoid 339 of switch 340, thus permitting the switch wipers to advance to home position; closes interrupter switch 361; opens the normally open switch 360 which de-energizes relay 358. Further stepping of wipers of switch 340 is thus stopped.

The breaking of the circuit through switch 307 also breaks the original circuit which energized relay 308, but neither it nor relay 355 are de-energized because a holding circuit is provided through the "live" line 356 which now gets current from any one of the seven normally open switches 360 and their associated relays 358, 359 or 357 which may yet remain closed and energized.

It now remains only to step the wipers of switches 342 and 311 (Fig. 6), in the survey office, and the wipers of switches 313 (Fig. 7), in the three central offices to their home positions. This is accomplished in each case by the repeated energizing and de-energizing of the switches' stepping coils 353, 346 or 345, as their circuit is repeatedly opened and closed through their interrupter switches 361, from current source through closed contact B of relays 358 or 347 which is held energized from the same current source passing through still-closed contact A of switch 360 and closed contact A of relays 358 or 357.

As each wiper of the various stepping switches 342, 311 or 313 reaches home the arm 362 on the wiper shaft causes its off-normal switch 360 to open. The associated relay 358 or 357 is thereby de-energized and further stepping of the switches is stopped.

When the stepping switch which was farthest from home position finally reaches it, the last of the off-normal switches 360 opens and de-energizes its associated relay. The heretofore live line 356 immediately becomes dead, and the relays 308 and 355 are de-energized. The relay 355, however, is a slow release relay so that its armature contact is not closed until contact C of relay 308 (which is now closed) has an opportunity to drive motor 301 sufficiently to open switch 307 after which, and before switch 305 shifts contacts, it closes. This point is the true end and start of the cycle of motor 301 and its cams.

An entirely new survey will now be taken of the 100 TV sets which were just finished being surveyed. If such second complete survey is to be delayed until some future time, a main switch in the A. C. line to motor 301 may be opened, either manually or electrically, at the time switch 307 opens as described just above.

The invention in its broader aspects is not limited to the specific mechanisms shown and described but departures may be made therefrom within the scope of the accompanying claims without departing from the principles of the invention and without sacrificing its chief advantages.

What is claimed is:

1. In a system for surveying the condition and station setting of separate communication receivers of radiant energy, said system being energized by an integrated alternating current power system having a common frequency, the combination of a survey office containing means for indicating time, individual receiver identifying data and corresponding station setting, said survey office having separate telephone lines connecting it with substations, selector switch means at the survey office for selecting successive telephone lines for activating successive substations, each substation handling a compact group of receivers and including the following: a multipoint scan switch for a receiver, said scan switch having a movable contact cooperating with an array of fixed contact points, each fixed point corresponding to a possible receiver setting, means including substantially constant speed alternating current motor means initially inoperative for driving said movable contact through one complete scan cycle during which the movable contact sequentially sweeps the entire contact array and thus scans all possible receiver settings, means at the substation responsive to a pulse for initially energizing said contact driving means so that a scan cycle is initiated, pulsing circuits connecting said scan switch and its group telephone line, said circuits providing at said scan switch a pulse corresponding to each scan switch fixed contact point in said array, means connected to the movable and fixed contact points and controlled by a receiver setting, and operative only when the receiver is operating; for disabling those pulsing circuits corresponding to all receiver settings sequentially following the selected receiver setting in the scan cycle; said survey office having a master cycle switch means including substantially constant speed alternating current motor means operating over a period somewhat longer than the scan period, means included in said master switch means and operative at the start of a master cycle for setting the receiver identifying indicating means to correspond to the receiver to be scanned, means included in said master cycle switch means for connecting the station identifying indicating means to the active telephone line, means included in said master cycle switch means for pulsing the selected telephone line for initiating a scan cycle, said pulse occurring early enough in the master cycle so that a scan cycle may be included in the remainder of said master switch cycle, sequential means at the survey office responsive to pulses from a substation to set the station identifying indicating means to a position determined by the number of scan pulses sent, means controlled by said master cycle switch means for indicating all the data at the end of a master cycle, and means at each substation for sequentially conditioning the individual scan means for the receivers so that successive scan cycles are executed by the respective scan means at a substation whereby all receivers in a substation group are scanned.

2. In a system for surveying the condition and station setting of separate communication receivers of radiant energy, said system being energized by an integrated alternating current power system having a common frequency, the combination of a survey office containing means for indicating time, individual receiver data and station settings corresponding thereto, said survey office having separate telephone lines connecting the same with substations, selector switch means at the survey office for activating successive substations, each substation handling a compact group of receivers and including the following: a multipoint scan switch for each receiver, said scan switch having a movable contact cooperating with an array of fixed contact points, each fixed contact point corresponding to a possible receiver setting, means including substantially constant speed type alternating current motor means initially inoperative for driving said movable contact through one complete scan cycle during which the movable contact sweeps the entire contact array and thus scans all possible receiver settings, means at the substation responsive to a pulse from its telephone line and originating at the survey office for energizing initially said contact driving means so that a scan cycle is initiated, pulsing circuits connecting said scan switch with the telephone line for the particular substation in which the scan switch is located, said circuits providing at said scan switch a pulse corresponding to each scan switch contact point in each array as the switch is sweeping durinfg its cycle, means connected to the fixed contact points and controlled by the station setting of the receiver, and operative only when the receiver is operating, for disabling those pulsing circuits corresponding to all receiver settings sequentially following the station setting for the receiver during the course of the station scan cycle; said survey office having master cycle switch means including substantially constant speed alternating current motor means, said master cycle switch means having a period somewhat longer than the scan period, said master switch means including additional means for setting the receiver identifying indicating means to correspond to the communication receiver to be scanned, means included in said master cycle switch means for connecting the station identifying indicating means to the telephone line selected by the survey office selector switch, means included in said master cycle switch means for pulsing the selected telephone line for initiating a scan cycle at said substation, means at the survey office responsive to pulses from a substation to set the station identifying indicating means to a position determined by the number of scan pulses sent, means controlled by said master cycle switch means for indicating all pertinent data including time, receiver identification and station setting after a receiver has been scanned, means at each substation for successively conditioning the individual scan means so that successive scan cycles are executed by the respective scan means at a substation and means for operating the survey office selector switch to select another telephone line and thus connect a new substation when a previous substation has completed all its scan cycles.

3. The system according to claim 2 wherein each communication receiver has a second multipoint switch, said second switch having a movable contact and an array of fixed contacts, connections between the fixed contacts of the two multipoint switches for a receiver, said connections providing individual station selecting circuits, means for positioning the movable contact of the second multipoint switch to correspond with the station selecting element of the receiver and means for simultaneously energizing the communication receiver and the multipoint switch circuits.

4. The system according to claim 2 wherein each substation includes means responsive to one polarity of a pulse for setting the substation scan means into condition for operation, means responsive to a pulse of opposite polarity for initiating a scan cycle operation and means at the survey office for initiating a master cycle with a pulse of one polarity and means for transmitting said pulse of opposing polarity successively through the selected telephone line.

5. The system according to claim 2 wherein each substation has a receiver selector switch connected between the substation telephone line and the various receivers in said group, means responsive to a pulse of one polarity for advancing said receiver selector switch to connect a particular receiver to the group telephone line, means responsive to a pulse of opposite polarity for starting the operation of the scan means for the selected receiver, means at the survey office for transmitting a pulse of one polarity over the selected telephone line to the receiver selector switch and means at the survey office for transmitting a pulse of opposite polarity to initiate scan operation at a particular receiver, said pulses falling within the period of a master cycle period.

6. The system according to claim 2 wherein said survey office has stepping switch means for controlling receiver identifying indicating means, switches for handling various types of communication receivers such as for example, television receivers and AM broadcast receivers, means at each substation for cycling said receiver type switch and means for synchronizing said receiver type switch with the selector switch at the survey office for controlling the receiver type indicating means.

7. The system according to claim 2 wherein each substation is connected to all the receivers in its group by one pair of wires, means at each receiver for simultaneously beginning a group cycle in response to a pulse from the survey office and means controlled by said last named means for initiating a receiver scan cycle at a predetermined part of the group operating cycle, the scan cycle for one receiver being phased with respect to scan cycles for other receivers so that successive receivers are sequentially scanned during a group cycle.

8. In a system for surveying the condition and station setting of a group of separate communication receivers of radiant energy, said system being energized by an integrated alternating current power system having a common frequency, the combination of a survey office containing means for indicating time, identifying data for individual receivers and the station setting for such corresponding receiver, said survey office having separate telephone lines connecting it with substations, selector switch means at the survey office for activating successive substations, each substation handling a compact group of receivers and including the following: a multipoint scan switch for each receiver, said scan switch having a movable contact cooperating with an array of fixed contact points, each of such contact points corresponding to a possible receiver setting, means including substantially constant speed alternating current motor means initially inoperative for driving said movable contact through a complete station scan cycle during which the movable contact sweeps the entire contact array and thus scans all possible receiver settings, pulsing circuits connecting each scan switch and the telephone line corresponding to the group containing the scan switch, such circuit providing at each scan switch a pulse corresponding to each possible receiver setting scanned, means connected to the fixed contact points of the multipoint switch and controlled by a receiver station setting, and operative only when the associated receiver is operating, for disabling those pulsing circuits corresponding all settings following the selected station setting in the station scan cycle for a particular receiver, scan cycle initiating means for each multipoint switch, said scan cycle initiating means including substantially constant speed alternating current motor means, said means having an operating cycle which includes successive individual scan cycles so that the group cycle period is equal to at least the sum of the individual receiver scan cycle periods, means for phasing the individual scan cycle initiating means so that the scan cycle of one receiver is followed by the scan cycle of another receiver, all the receiver scan cycles thus following in succession but with only one receiver scan cycle occurring during a group cycle; a connection from the substation telephone line to the scan cycle initiating means, means at each scan cycle initiating means and responsive to a pulse for simultaneously operating all the scan cycle initiating means to start a group cycle, said survey office having a master cycle switch means including substantially constant speed alternating current motor means, means for operating said master cycle switch means in synchronism with the group scan cycle initiating means, said master cycle switch means including means for setting, at the beginning of a scan cycle, the receiver identifying indicating means to correspond to receiver to be scanned, said master switch means also including means for connecting the station identifying indicating means to the active telephone line during a station scan cycle, means controlled by said master switch means for resetting the station identifying indicating means and the receiver identifying indicating means between successive scan cycles, means at the survey office responsive to pulses from a substation to set the station identifying indicating means during a scan cycle to a position determined by the number of scan pulses sent, and means controlled by said master switch means for indicating all the data pertinent to a scan cycle between successive scan cycles.

9. For use in a system for surveying the condition and station setting of a number of separate communication systems of radiant energy, said system being energized by an integrating alternating current power system having a common frequency, a substation for handling a compact group of receivers, said substations having a number of local stations connected in parallel, each local station including a multipoint switch having a movable contact cooperating with an array of fixed contact points, each of said contact points corresponding to a possible receiver setting, pulsing circuits connected to a multipoint switch, said switch being adapted to originate a pulse for each station scanned, means connected to the fixed contact points and controlled by a receiver station setting, and operative only when the associated receiver is operating, for disabling those pulsing circuits corresponding to the settings sequentially following the selected station setting in the path of travel of the movable contact over one operating cycle of said movable contact, means including substantially constant speed alternating current motor means at each local station for starting a substation cycle in response to a pulse and means operated by said last named means for initiating a cycle of movement for the movable contact at a predetermined point in the group cycle, the station scanning cycle being adapted to be adjusted so that sequential scanning of each receiver takes place.

10. In a system for surveying the condition and station setting of a number of separate communication receivers of radiant energy, said system being energized by an integrated alternating current power system having a common frequency, a first multipoint switch comprising a movable contact and a number of fixed contacts cooperating therewith, each fixed contact corresponding to a possible station setting for the receiver, means for coupling the movable contact to the station selector means of a receiver so that the position of the movable contact is determined by the tuning of said station, a second multipoint switch having double the number of fixed contacts and having a movable contact cooperating therewith, said second switch having its fixed contacts divided up into two groups, the contacts of one group alternating with the contacts of the other group, a connection joining all the contacts of the one group, a circuit connecting the contacts of said first group, connections between individual fixed contacts of the first multipoint switch and the contacts forming the second group of the second multipoint switch, a disabling circuit connected between the wiper of the first multipoint switch and the wiper of the second multipoint switch, pulsing means in said circuits connected to the first group of contacts and means controlled by said disabling circuit for disabling said pulsing circuit when the two movable contacts are on the fixed contacts corresponding to the station setting and for maintaining said pulsing circuits disabled for the balance of the scan cycle and means including substantially constant speed alternating current motor means for moving the movable contact of said second multipoint switch for one trip at a time as a scanning cycle for all of the contacts thereof.

11. The structure according to claim 10 wherein there is provided a synchronous type electric motor, a cam shaft driven thereby, said cam shaft having a cam, switch means controlled by said cam, said cam being adapted to close said switch for a portion of the time taken to make one complete turn of the cam, means controlled by said switch for moving the movable contact of said second multipoint switch, the switch controlled by the cam being adapted to maintain the movable contact in motion for one station scan cycle and a plurality of additional multipoint switches and motor driven cam shaft units for additional receivers, all the receivers to be handled forming a group having a group scan cycle consisting of successive individual receiver scan cycles, the cam shaft in each receiver unit making one complete turn for a group scanning cycle and the cams in the various receiver units being angularly staggered so that the switches are successively maintained in closed condition to provide successive individual receiver scan cycles, and means for starting the motors for driving the cam shafts simultaneously.

12. The structure according to claim 11 wherein means for driving the movable contact of the second multipoint switch comprises a synchronous type motor controlled by the cam operated switch and means on said second multipoint switch for stopping the drive of said movable contact at a home position.

13. In a system for surveying the condition and station setting of separate communication receivers of radiant energy, the combination of a survey office and at least one substation for handling a compact group of receivers, one communication channel between said survey office and said substation, a source of alternating current for energizing both the survey office and the substation, said source providing alternating current at the same frequency at both the survey office and substation, synchronous timing motors at the survey office and substation, a receiver identifying indicating means at the survey office containing receiver identification data in sequence corresponding to the receivers in the substation, scanning means at each receiver adapted to scan the settings of said receiver in the same sequence as provided for in the indicating means, means controlled by the motor at the survey office for establishing a master cycle, means controlled by said master cycle establishing means for sequentially changing the setting of the station identifying indicating means, said station identifying indicating means being adapted to be changed with each master cycle, means responsive to a receiver scanning means for sequentially moving the receiver setting indicating means from a normal position to a position to indicate a receiver setting in response to signals sent by said scanning means, a synchronous motor for operating the scanning means for a receiver, means for starting the synchronous motor for scanning a receiver a predetermined time after the start of a master cycle, said master cycle including a scan cycle, means controlled by the synchronous motor at the survey office for indicating the receiver identification and receiver setting data at the end of each master cycle and means for sequentially scanning the receivers in said group.

References Cited in the file of this patent

UNITED STATES PATENTS

| Number | Name | Date |
|---|---|---|
| 1,600,358 | Puckette | Sept. 21, 1926 |
| 1,955,043 | Yates et al. | Apr. 17, 1934 |
| 2,484,733 | Rahmel et al. | Oct. 11, 1949 |